United States Patent
Koranne

(10) Patent No.: US 10,444,734 B2
(45) Date of Patent: Oct. 15, 2019

(54) MANUFACTURE OF NON-RECTILINEAR FEATURES

(71) Applicant: Mentor Graphics Corporation, Wilsonville, OR (US)

(72) Inventor: Sandeep Koranne, West Linn, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 304 days.

(21) Appl. No.: 15/002,239

(22) Filed: Jan. 20, 2016

(65) Prior Publication Data

US 2016/0136899 A1    May 19, 2016

Related U.S. Application Data

(63) Continuation-in-part of application No. 14/832,716, filed on Aug. 21, 2015, now abandoned.

(60) Provisional application No. 62/040,950, filed on Aug. 22, 2014.

(51) Int. Cl.
*G05B 19/4099* (2006.01)
*G06F 17/17* (2006.01)
*B29C 64/386* (2017.01)
*B33Y 50/02* (2015.01)
*G02B 6/136* (2006.01)

(52) U.S. Cl.
CPC ........ *G05B 19/4099* (2013.01); *B29C 64/386* (2017.08); *G06F 17/175* (2013.01); *B33Y 50/02* (2014.12); *G02B 6/136* (2013.01); *G05B 2219/35134* (2013.01); *G05B 2219/49007* (2013.01); *Y02P 90/265* (2015.11)

(58) Field of Classification Search
None
See application file for complete search history.

(56) References Cited

U.S. PATENT DOCUMENTS

| | | | |
|---|---|---|---|
| 7,284,214 B2 | 10/2007 | LeBritton et al. | |
| 7,836,423 B2 | 11/2010 | Adam | |
| 8,015,510 B2 | 9/2011 | Brunet et al. | |

(Continued)

OTHER PUBLICATIONS

Ladouceur et al. "A New General Approach to Optical Waveguide Path Design", Mar. 1995, Journal of Lightwave Technology vol. 13, No. 3, IEEE, pp. 481-492.*

(Continued)

*Primary Examiner* — Suzanne Lo

(57) ABSTRACT

Methods and apparatus are disclosed for symbolic methods using algebraic geometry (e.g., based on a Gröbner basis of tangent space polynomials of parametric curves). For example, the design, optimization and verification of silicon photonic wave guides using parametric polynomials and/or Gröbner basis functions can be used to perform envelope generation, rectification, manufacturability checking, singularity detection, reticle and etch processing model generation, tapering loss minimization, and bend loss minimization. In one example, a method of analyzing a layout to be manufactured using a photolithographic process includes producing an envelope of a curve representing a layout object based at least in part on a Gröbner basis and performing one or more analysis operations for the envelope to perform verification and manufacturability checks.

19 Claims, 18 Drawing Sheets

(56) References Cited

U.S. PATENT DOCUMENTS

| | | | |
|---|---|---|---|
| 8,019,585 | B2 | 9/2011 | Rahman et al. |
| 8,024,673 | B2* | 9/2011 | Nitta .................. G06F 17/5068 |
| | | | 716/119 |
| 8,051,393 | B2 | 11/2011 | Brunet et al. |
| 8,516,399 | B2 | 8/2013 | Paris et al. |
| 8,555,212 | B2 | 10/2013 | Sawicki et al. |
| 8,572,533 | B2 | 10/2013 | Ferguson et al. |
| 8,612,919 | B2 | 12/2013 | Pikus et al. |
| 8,627,240 | B1* | 1/2014 | Acar .................. G06F 17/5081 |
| | | | 385/14 |
| 8,799,830 | B2 | 8/2014 | Robles |
| 2004/0014253 | A1 | 1/2004 | Gupta et al. |
| 2004/0063000 | A1 | 4/2004 | Maurer et al. |
| 2004/0088149 | A1 | 5/2004 | Cobb |
| 2005/0262454 | A1 | 11/2005 | Chase et al. |
| 2007/0253637 | A1 | 11/2007 | Adam |
| 2008/0115096 | A1 | 5/2008 | Pikus |
| 2008/0115097 | A1 | 5/2008 | Pikus et al. |
| 2008/0141193 | A1 | 6/2008 | Pikus |
| 2008/0168410 | A1 | 7/2008 | Pikus et al. |
| 2008/0189667 | A1 | 8/2008 | Pikus et al. |
| 2008/0215943 | A1 | 9/2008 | Guo et al. |
| 2009/0106715 | A1* | 4/2009 | Pikus .................. G06F 17/5081 |
| | | | 716/106 |
| 2012/0227024 | A1 | 9/2012 | Uppaluri et al. |
| 2014/0007032 | A1 | 1/2014 | Acar et al. |
| 2014/0380258 | A1 | 12/2014 | Hours et al. |
| 2016/0055122 | A1 | 2/2016 | Koranne |
| 2016/0055289 | A1 | 2/2016 | Cao et al. |

OTHER PUBLICATIONS

Botana et al. "Some issues on the automatic computation of plane envelopes in interactive environments" Jun. 20, 2014, ScienceDirect, pp. 115-125.*

Hossan et al. "Improving SoC productivity through automatic design rule waiver processing for legacy IP", Apr. 1, 2013, 3 pages.*

"PREMUR 2007 Seminar Week 3 Computer Laboratory Exercises" 2007, 5 pages.*

Schulte, Christian. "Design Rules in VLSI Routing", Dissertation, Jun. 2012, 86 pages. (Year: 2012).*

Barton et al., "The polygon package," *IPC Business Press*, vol. 12, No. 1, Jan. 1980, 9 pages.

Berberich et al., "Exact Symbolic-Numeric Computation of Planar Algebraic Curves," arXiv:1201.1548v1, Jan. 10, 2012, 46 pages.

Berberich et al., "EXACUS: Efficient and Exact Algorithms for Curves and Surfaces," *Lecture Notes in Computer Science*, vol. 3669, 12 pages.

Bogaerts et al., Compact Single-Mode Silicon Hybrid Rib /Strip Waveguide With Adiabatic Bends, *IEEE Photonics Journal*, vol. 3, No. 3, Jun. 2011, 12 pages.

Bogaerts et al., "Design Challenges in Silicon Photonics," *IEEE Journal of Selected Topics in Quantum Electronics*, vol. 20, No. 4, Jul./Aug. 2014, 8 pages.

Bogaerts et al., "IPKISS: A parametric Design and Simulation Framework for Silicon Photonics," *2012 IEEE 9th International Conference on Group IV Photonics (GFP)*, Aug. 2012, pp. 30-32.

Bogaerts et al., "Nanophotonic Waveguides in Silicon-on-Insulator Fabricated With CMOS Technology," *Journal of Lightwave Technology*, vol. 23, No. 1, Jan. 2005, pp. 401-412.

Cai et al., "Study of Coupling Length of Concentrically Curved Waveguides," *IEEE Photonics Journal*, vol. 4, No. 1, Feb. 2012, 7 pages.

Cao et al., "DRC Challenges and Solutions for Non-Manhattan Layout Designs," *2014 International Conference on Optical MEMS and Nanophotonics*, Aug. 2014, pp. 175-176.

Ding et al., "OIL: A Nano-photonics Optical Interconnect Library for a New Photonic Networks-on-Chip Architecture," *Proceedings of the 11th international workshop on System level interconnect prediction*, Jul. 2009, pp. 11-18.

Dragone, "An N X N Optical Multiplexer Using a Planar Arrangement of Two Star Couplers," *IEEE Photonics Technology Letters*, vol. 3, No. 9, Sep. 1991, pp. 812-815.

Dragone, "Theory of Wavelength Multiplexing With Rectangular Transfer Functions," *IEEE Journal of Selected Topics in Quantum Electronics*, vol. 8, No. 6, Nov./Dec. 2002, pp. 1168-1178.

Dumon et al., "Towards foundry approach for silicon photonics: silicon photonics platform ePIXfab," *Electronics Letters*, vol. 45, No. 12, Jun. 2009, pp. 581-582.

Fabri et al., "The CGAL Kernel: A Basic for Geometric Computation," *In 1st ACM Workshop on Applied Computational Geometry*, Dec. 1996, 12 pages.

Fabri et al., "CGAL—The Computational Geometry Algorithms Library," *HAL Archives*, May 2011, 7 pages.

Fabri et al., "On the Design of CGAL, the Computational Geometry Algorithms Library," *HAL Archives*, May 2006, 14 pages.

Fogel et al., "Specification of the traits classes for CGAL arrangements of curves," *Tech. Report ECG-TR-241200-01, INRIA Sophia-Antipolis*, May 2003, 9 pages.

Gunn, "CMOS Photonics for High-Speed Interconnects," *IEEE Micro*, vol. 26, No. 2, Mar.-Apr. 2006, pp. 58-66.

Hanniel, "The Design and Implementation of Planar Arrangements of Curves in CGAL," *Thesis—School of Computer Science, Tel-Aviv University*, Dec. 2000, 87 pages.

Hendry et al., "VANDAL: A Tool for the Design Specification of Nanophotonic Networks," *2011 Design, Automation & Test in Europe Conference & Exhibition*, Mar. 2011, 6 pages.

Hu et al., "Computing Optimal Waveguide Bends With Constant Width," *Journal of Lightwave Technology*, vol. 25, No. 10, Oct. 2007, pp. 3161-3167.

Jalali et al., "Silicon Photonics," *IEEE Microwave Magazine*, Jun. 2006, pp. 58-68.

Ji et al., Five-Port Optical Router Based on Microring, Switches for Photonic Networks-on-Chip, *IEEE Photonics Technology Letters*, vol. 25, No. 5, Mar. 2013, pp. 492-495.

Kaminow et al., "Optical Integrated Circuits: A Personal Perspective," *Journal of Lightwave Technology*, vol. 26, No. 9, May 2008, pp. 994-1004.

Kim et al., "Vector Analysis of Optical Dielectric Waveguide Bends Using Finite-Difference Method," *Journal of Lightwave Technology*, vol. 14, No. 9, Sep. 1996, pp. 2085-2092.

Koos et al., "Ideal Bend Contour Trajectories for Single-Mode Operation of Low-Loss Overmoded Waveguides," *IEEE Photonics Technology Letters*, vol. 19, Issue 11, Jun. 2007, pp. 819-821.

Krause, "Finite-Difference Mode Solver for Curved Waveguides With Angled and Curved Dielectric Interfaces," *Journal of Lightwave Technology*, vol. 29, No. 5, Mar. 2011, pp. 691-699.

Ladouceur et al., "A New General Approach to Optical Waveguide Path Design," *Journal of Lightwave Technology*, vol. 13, No. 3, Mar. 1995, pp. 481-492.

Lee et al., "Monolithic Silicon Integration of Scaled Photonic Switch Fabrics, CMOS Logic, and Device Driver Circuits," *Journal of Lightwave Technology*, vol. 32, No. 4, Feb. 2014, pp. 743-751.

Lee et al., "The Role of Photomask Resolution on the Performance of Arrayed-Waveguide Grating Devices," *Journal of Lightwave Technology*, vol. 19, No. 11, Nov. 2001, pp. 1726-1733.

Leijtens et al., "S-Matrix Oriented CAD-Tool for Simulating Complex Integrated Optical Circuits," *IEEE Journal of Selected Topics in Quantum Electronics*, vol. 2, No. 2, Jun. 1996.

Mentor Graphics Corp., "Calibre eqDRC Datasheet," 2008, 2 pages.

Nagarajan et al., Large-Scale Photonic Integrated Circuits, *IEEE Journal of Selected Topics in Quantum Electronics*, vol. 11, No. 1, Jan./Feb. 2005, pp. 50-65.

Orcutt et al., "Photonic Device Layout Within the Foundry CMOS Design Environment," *IEEE Photonics Technology Letters*, vol. 22, No. 8, Apr. 2010, pp. 544-546.

Overmars, "Designing the Computational Geometry Algorithms Library CGAL," *Workshop on Applied Computational Geometry, Towards Geometric Engineering*, 1996, 6 pages.

Pathak et al., "Comparison of AWGs and Echelle Gratings for Wavelength Division Multiplexing on Silicon-on-Insulator," *IEEE Photonics Journal*, vol. 6, No. 5, Oct. 2014, 10 pages.

(56) References Cited

OTHER PUBLICATIONS

Pathak et al., "Effect of Mask Discretization on Performance of Silicon Arrayed Waveguide Gratings," *IEEE Photonics Technology Letters*, vol. 26, No. 7, Apr. 2014, pp. 718-721.

Pikus et al., "Calibre eqDRC: A Programmable Modeling Engine," *White Paper, Mentor Graphics Corporation*, 2003, 4 pages.

Pikus, "Traditional design rule checking (DRC) uses one-dimensional measurements," *ACM/SIGDA E-newsletter*, vol. 40, No. 2, Feb. 2010, 5 pages.

Selvaraja et al., "Subnanometer Linewidth Uniformity in Silicon Nanophotonic Waveguide Devices Using CMOS Fabrication Technology," *IEEE Journal of Selected Topics in Quantum Electronics*, vol. 16, No. 1, Jan./Feb. 2010, pp. 316-324.

Vlasov et al., "Silicon Photonic Crystals and Photonic Wires Circuits," *2005 Conference on Lasers and Electro-Optics Europe*, Jun. 2005, p. 587.

Abhyankar, "Algebraic Geometry for Scientists and Engineers," *American Mathematical Society*, $1^{st}$ edition, Jul. 26, 1990, 132 pages, including pp. 17-82, 119-241, 267-295.

Alcazar, "Good global behavior of offsets to plane algebraic curves," *Journal of Symbolic Computation*, vol. 43, Issue 9, pp. 659-680.

Arrondo et al., "Parametric Generalized Offsets to Hypersurfaces," *Journal of Symbolic Computation*, vol. 23, Issues 2-3, Feb. 1997, pp. 267-285.

Baidya, "Layout Verification for Mixed-domain Integrated MEMS," Ph.D. Thesis, *Carnegie Mellon University*, Aug. 2003, 230 pages.

Baidya et al., "Layout Verification for Mixed-Domain Integrated MEMS," *IEEE Transactions on Computer-Aided Design of Integrated Circuits and Systems*, vol. 24, No. 4, Apr. 2005, pp. 563-577.

Boissonnat et al., "Algorithmic Geometry," *Cambridge University Press*, © 1998, 544 pages.

Boissonnat et al., "Effective Computational Geometry for Curves and Surfaces," Chapter 5—Meshing of Surfaces, *Springer-Verlag Berlin Heidelberg*, © 2006, 43 pages.

Chrostowski et al., "Silicon Photonics Design," © 2012, 211 pages.

Collins et al., "Partial Cylindrical Algebraic Decomposition for Quantifier Elimination," *Journal of Symbolic Computation*, vol. 12, Issue 3, Sep. 1991, pp. 299-328.

Eigenwillig et al., "Exact, efficient, and complete arrangement computation for cubic curves," *Computational Geometry*, vol. 35, Issues 1-2, Aug. 2006, pp. 36-73.

Eigenwillig et al., "Snap Rounding of Bézier Curves," *Proceedings of the $23^{rd}$ Annual Symposium on Computational Geometry*, Jun. 2007, pp. 158-167.

"FDTD Solutions a high performance 3D FDTD-method Maxwell solver for the design, analysis and optimization of nanophotonic devices, process and materials," downloaded from https://www.lumerical.com/tcad-products/fdtd/ on Sep. 20, 2016, 2 pages.

Gallagher, Designing Active Photonic Integrated Circuits using TDTW, *Integrated Photonics and Nanophotonics Research and Applications, Optical Society of America*, © 2008, 3 pages.

Koranne, "Design and Analysis of Silicon Photonics Wave Guides Using Symbolic Methods," *IEEE Transactions on Computer-Aided Design of Integrated Circuits and Systems*, vol. 34, No. 3, Mar. 2015, pp. 341-353.

Melloni et al., "Design Kits and Circuit Simulation in Integrated Optics," *Integrated Photonics Research, Silicon and Nanophotonics and Photonics in Switching, OSA Technical Digest, Optical Society of America*, © 2010, 3 pages.

Pond et al., "A complete design flow for silicon photonics," *SPIE Proceedings, vol. 9133, Silicon Photonics and Photonic Integrated Circuits IV*, May 2014, 17 pages.

"Reduce Computer Algebra System," downloaded from http://www.reduce-algebra.com on Sep. 20, 2016, 2 pages.

"RSoft Photonic Design Software: Photonic Device & Optical Communications System Design," downloaded from https://optics.synopsys.com/rsoft/ on Sep. 20, 2016, 3 pages.

Yu et al., "The Design of Core 2: A Library for Exact Numeric Computation in Geometry and Algebra," *Proceedings of the $3^{rd}$ International Congress Conference on Mathematical Software*, Sep. 2010, pp. 121-141.

Cao et al., "LVS Check for Photonic Integrated Circuits—Curvilinear Feature Extraction and Validation," *2015 Design, Automation & Test in Europe Conference & Exhibition*, pp. 1253-1256 (2015).

\* cited by examiner

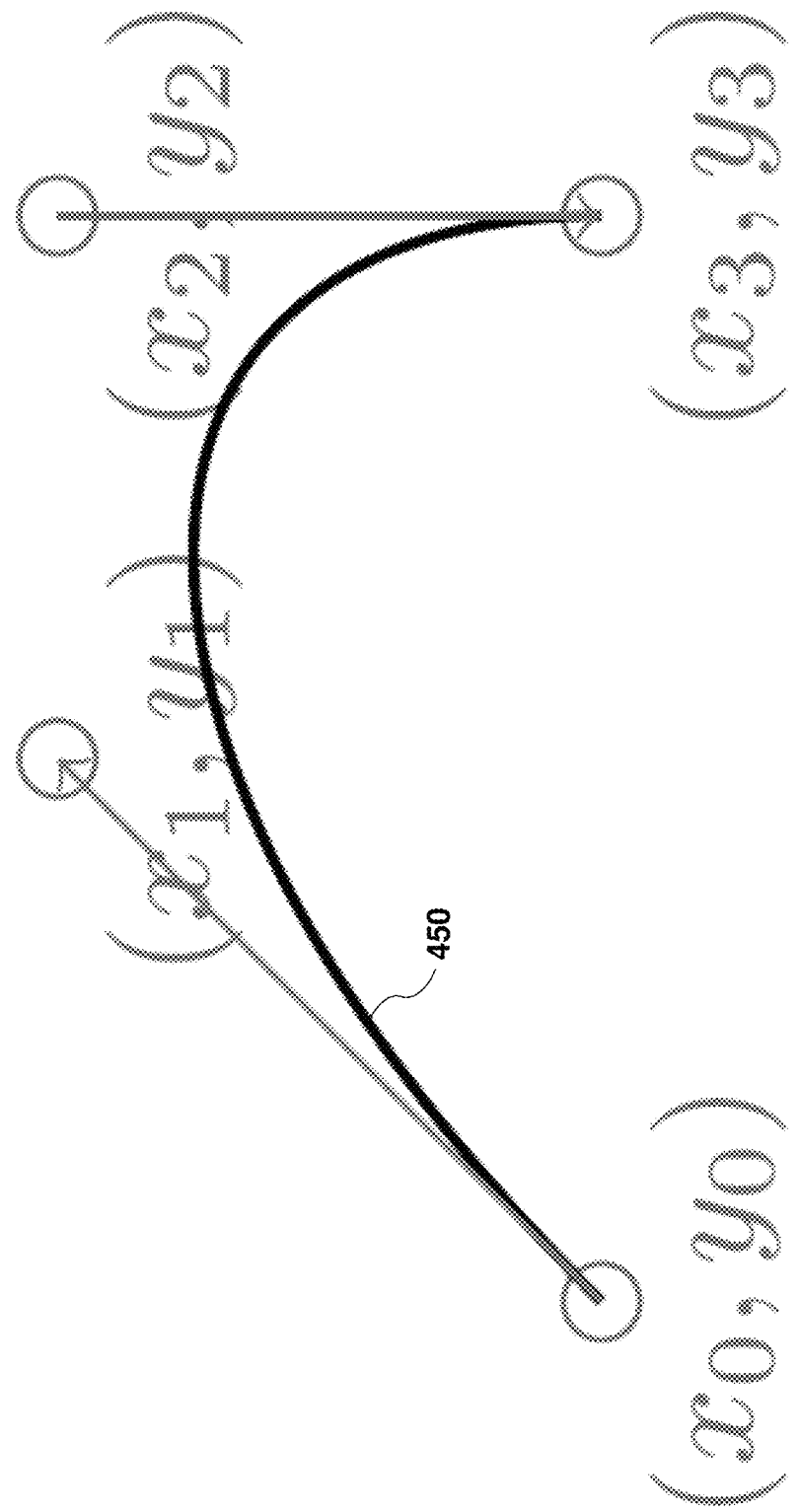

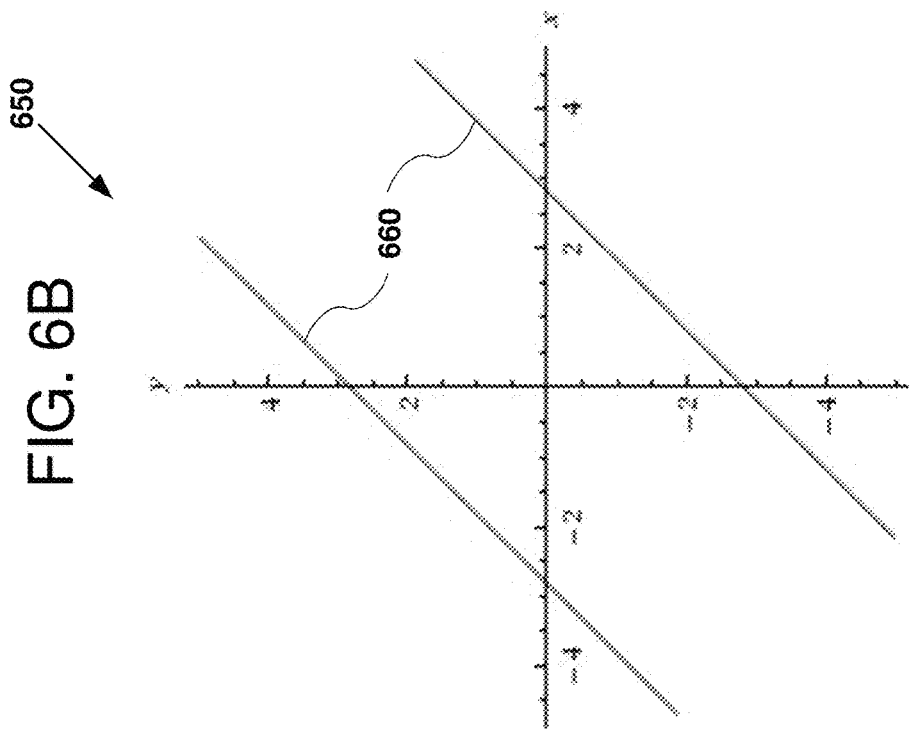
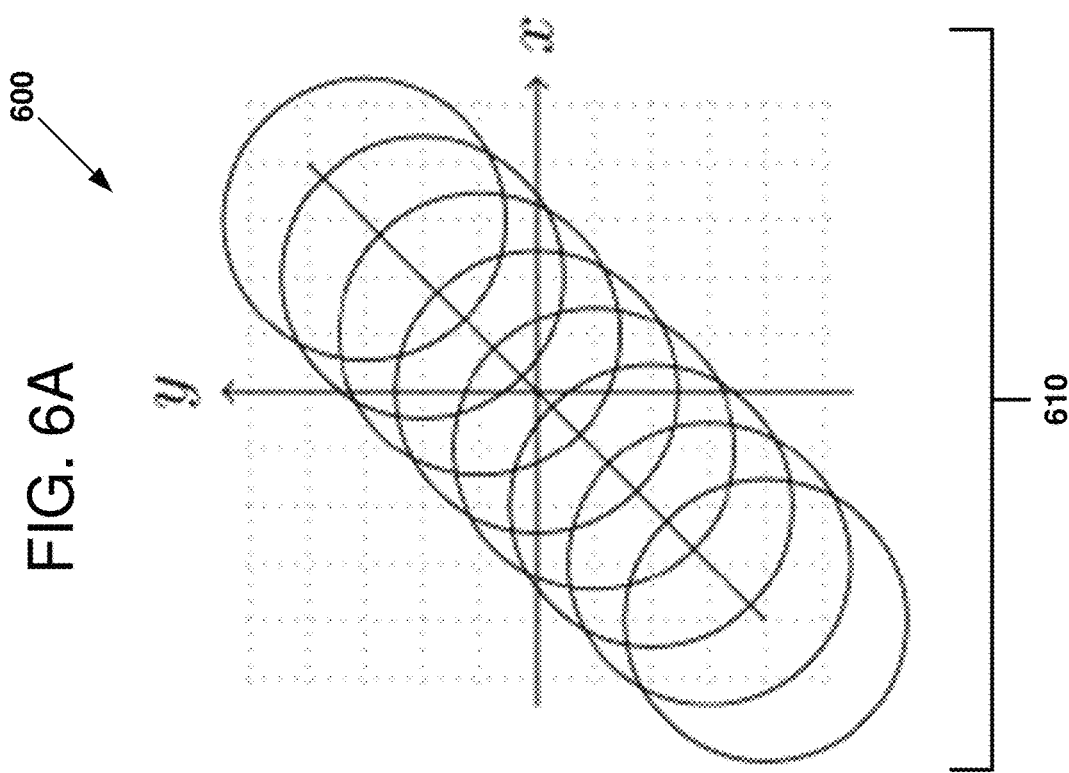

MANUFACTURE OF NON-RECTILINEAR FEATURES

CROSS-REFERENCE TO RELATED APPLICATIONS

This application is a continuation-in-part of U.S. patent application Ser. No. 14/832,716, entitled "DESIGN AND ANALYSIS OF SILICON PHOTONICS ARRAY WAVE GUIDES," filed Aug. 21, 2015, which claims the benefit of U.S. Provisional Application No. 62/040,950, filed Aug. 22, 2014. U.S. patent application Ser. No. 14/832,716 and 62/040,950 are incorporated herein by reference in their entireties.

BACKGROUND

Generating lithography design information for non-rectilinear features, such as circles and curves, can be performed by approximating such features using with piecewise linear (PWL) approximations) with a number of small, straight, rectilinear lines. Such approximations can cause significant performance, accuracy, and data size issues when applied to curvilinear surfaces. Accordingly, there is ample opportunity for improvements to methods for the design, analysis, and manufacture of non-rectilinear features.

SUMMARY

Apparatus and methods are disclosed for the design, analysis, testing, and manufacture of layout including curved objects, including silicon photonic array wave guides, micro-electronic mechanical systems (MEMS) and/or a micro-fluidics VLSI layouts. The layouts can be manufacturing using, for example, photolithographic processes including the use of patterned masks and/or reticles. In some examples, electronic beams are employed to perform layout patterning.

In some examples of the disclosed technology, a method of analyzing a layout to be manufactured using a photolithographic process includes producing an envelope of a curve based at least in part on a Gröbner basis, the curve representing an object in the layout, and performing one or more analysis operations for the envelope.

In some examples, the analysis operations include at least one or more of the following verification checks: a dimensional check, a spacing check, a width check, and/or an enclosure check.

In some examples, the analysis operations include at least one or more of the following operations: singularity detection, manufacturability checking, and/or bias application.

In some examples, the analysis operations include dimensional checks using quantifier elimination.

In some examples, the analysis operations include filtering data representing the layout using rectilinear bounding boxes representing the extent of a plurality of objects in the layout.

In some examples of the disclosed technology, a curved layout is represented using a system of one or more equations. In some examples, the layout object comprises optical interconnect. In some examples, the layout comprises one or more silicon photonic devices. In some examples, the layout comprises curves for a micro-electronic mechanical system (MEMS) and/or a micro-fluidics VLSI layout. In some examples, the curve is a parametric curve or a Bezier curve. In some examples, the envelope is produced based at least in part using Buchberger's algorithm.

In some examples of the disclosed technology, a method further includes, based on the performing the analysis operations, storing the layout in a computer readable storage medium. In some examples of the disclosed technology, a method further includes, based on the performing the analysis operations, generating a file comprising instructions for a mask or reticle manufacturing tool. In some examples of the disclosed technology, a method further includes, based on the performing the analysis operations, manufacturing an integrated circuit. In some examples of the disclosed technology, a method further includes, based on the performing the analysis operations, generating one or more waivers for a design rule or manufacturability check. In some examples of the disclosed technology, a method further includes, based on the performing the analysis operations, modifying the layout object.

In some examples of the disclosed technology, one or more computer readable storage media store computer-readable instructions that when executed by a computer, cause the computer to perform any one of the disclosed methods.

This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the disclosed subject matter will become more apparent from the following detailed description, which proceeds with reference to the accompanying figures. Further, any trademarks used herein are the property of their respective owners.

BRIEF DESCRIPTION OF THE DRAWINGS

FIG. 3A illustrates a circular bend and FIG. 3B illustrates an adiabatic bend, as can be used in certain examples of the disclosed technology.

FIGS. 4A-4B illustrate an example of parametric curves. In particular, FIG. 4A illustrates a parabola and FIG. 4B illustrates Bezier curve, as can be used in certain examples of the disclosed technology.

FIGS. 6A-6B depict a family of circles traveling on a line y=x and their corresponding envelope. In particular, FIG. 6A illustrates a family of circles on line y=x, and FIG. 6B illustrates a tangent space, as can be used in certain examples of the disclosed technology.

FIG. 9A illustrates dimensional checks and FIG. 9B illustrates upper/lower envelopes and EXT(A,B) and ENC(A, B) check.

DETAILED DESCRIPTION

I. General Considerations

Figure 1:
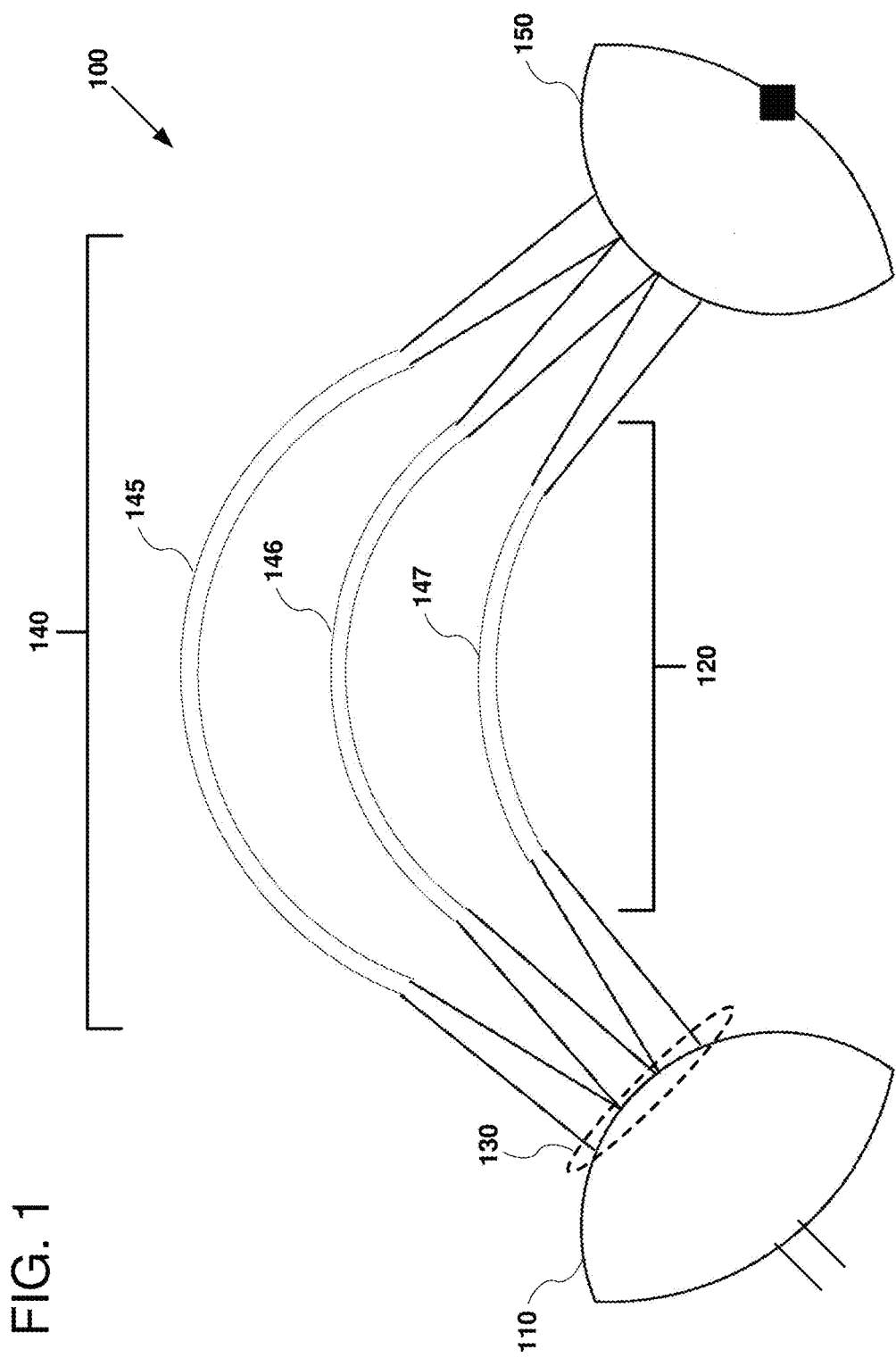
FIG. 1 is a schematic of an exemplary array waveguide grating (AWG).

This disclosure is set forth in the context of representative embodiments that are not intended to be limiting in any way.

As used in this application the singular forms "a," "an," and "the" include the plural forms unless the context clearly dictates otherwise. Additionally, the term "includes" means "comprises." Further, the term "coupled" encompasses mechanical, electrical, magnetic, optical, as well as other practical ways of coupling or linking items together, and does not exclude the presence of intermediate elements between the coupled items. Furthermore, as used herein, the term "and/or" means any one item or combination of items in the phrase.

The systems, methods, and apparatus described herein should not be construed as being limiting in any way. Instead, this disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like "produce," "generate," "display," "receive," "evaluate," "analyze," and "perform" to describe the disclosed methods. These terms are high-level descriptions of the actual operations that are performed. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Some of the disclosed methods can be implemented as computer-executable instructions stored on one or more computer-readable media (e.g., non-transitory computer-readable storage media, such as one or more optical media discs, volatile memory components (such as DRAM or SRAM), or nonvolatile memory components (such as hard drives and solid state drives (SSDs))) and executed on a computer (e.g., any commercially available computer, including smart phones or other mobile devices that include computing hardware). Any of the computer-executable instructions for implementing the disclosed techniques, as well as any data created and used during implementation of the disclosed embodiments, can be stored on one or more computer-readable media (e.g., non-transitory computer-readable storage media). The computer-executable instructions can be part of, for example, a dedicated software application, or a software application that is accessed or downloaded via a web browser or other software application (such as a remote computing application). Such software can be executed, for example, on a single local computer (e.g., as computer-readable instructions executing on any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

II. Introduction to the Disclosed Technology

Although the demise of Moore's law has been predicted many times in the recent past, the emergence of silicon photonics has the potential to extend the lifetime of Moore's law significantly. Photonics has been in use for the past several decades in the field of communications, in the form of optical interconnect, which has many advantages over conventional copper interconnect, as even at small distances, copper becomes bandwidth limited due to skin-effect and dielectric losses, and is rarely used at 10 GHz and above frequencies. Recently photonic device integration with on-chip silicon has resulted in the genesis of the field of silicon photonics and photonic integrated circuits.

However, before silicon photonics became ubiquitous, problems of silicon-based light emitters/lasers, and more importantly, low-cost manufacturing had to be resolved. Light emission in silicon is a challenge, as bulk crystalline silicon is an indirect bandgap material. This implies that the electron to photon conversion phenomenon is a second order effect in quantum mechanics, and correspondingly has a low probability of occurrence. This limitation can be overcome by using the principle of quantum confinement, and Raman scattering. Similarly, using the basic concepts of field-effect, researchers have created photonic structures where the refractive index of the silicon material changes with applied voltage, which in turn induces a phase shift in the optical path through the device, enabling the construction of photonic devices in CMOS very large scale integration (VLSI).

The other fundamental problem holding back silicon photonics was the cost of manufacturing integrated silicon photonic devices. Recently, compact integration of photonic circuits using silicon-on-insulator (SOI) fabrication processes (e.g., in complementary metal oxide semiconductor (CMOS) process techniques) has been performed. Utilizing CMOS processing for the generation, routing, and processing of light waves, silicon photonics has finally brought the full power of photonics to VLSI.

However, along with these benefits, significant challenges in computer aided design (CAD) and electronic design automation (EDA) of silicon photonics have also arisen. Silicon photonics structures (especially photonic index wires) are curvilinear, and thus present unique challenges to the computational geometry software implemented for VLSI layout design and analysis, the vast majority of existing software is designed and optimized for rectilinear data, omnipresent in conventional VLSI layouts. Current electronic design automation VLSI CAD systems are designed and optimized for Manhattan structures, and thus have difficulty operating on curvilinear structures of photonic ICs. Even planar, straight line, nonrectilinear polygons require specialized treatment, and computational geometry books always caution about the use of finite precision arithmetic when implementing standardized geometrical algorithms which assume infinite precision. One issue is the representation and maintenance of topological consistencies at intersection points of multiple nonrectilinear segments. Techniques such as snap-rounding and interval arithmetic are used, but these have implementation and run-time challenges. In VLSI CAD, correct and efficient handling of nonrectilinear data is still an ongoing topic for active research.

When curvilinear segments are added to the design, the situation becomes even more complex. The presence of non-Manhattan structures can cause problems of missed or confusing design rule checking (DRC) errors and the introduction of thousands of false errors, which have to be inspected manually. Other techniques include upfront scaling of the design by a factor of 10000× such that snapping and rounding issues are alleviated. However, conventional VLSI CAD tools often snap curvilinear shapes to grid lines during layout, which renders this technique useless for conjoint photonic structures which are formed by abutment of primitive shapes, as the intersection of these shapes may not lie on a grid point. Moreover, mask discretization has a very large impact on the performance characteristic of the waveguide. As the mask writing machines have limited precision, the upfront scaling of 10000× may be convenient for the design and verification of the drawn layout, but is akin to pushing the can down the road to the mask shop, where there is little or no control on the design layout. Researchers have reported either large degradation in waveguide performance, or unacceptably large mask processing runtime with nonoptimized curvilinear photonic structures. Existing computational geometry libraries may support curves for the construction of arrangements and 2-D intersection of curves, but tool performance is not comparable to standard scanline implementations. Further, silicon photonic layouts, especially waveguides have properties which are not present in conventional CMOS structures. For example, two (or more) waveguide layout structures may overlap, but with the correct wavelength design, do not logically intersect. Thus, the use of conventional layout verification software combines single layer intersecting polygons, presenting a challenge for layout versus schematic verification.

Containment and propagation of light in a dielectric slab waveguide is very sensitive to line edge roughness, and thus all aspects of VLSI manufacturing, such as lithography, optical proximity correction, mask data preparation, etch and resist models are desirably carefully optimized. To optimize chip area, design of waveguide curves of small curvature is required, but this increases bend loss. An accurate model, and optimization method is required, which allows the designer to perform tradeoffs between chip area and power transfer loss. Moreover, certain types of curves are more amenable to this tradeoff, and thus play an important role in parametric curve design for wave guides. The interface between the multimode fiber optic connection from off-chip systems to the single mode photonic index wire suffers from junction loss, and thus, accurate modeling of the vector equations to design diffraction gratings is required.

The disclosed technologies include methods based on Gröbner basis of tangent space polynomials of parametric curves. Disclosed technologies include design, optimization, and layout verification of silicon photonic waveguides, using parametric polynomials, and demonstrate the powerful method of Gröbner basis functions to solve complex problems such as envelope generation, rectification, biasing, manufacturability verification, reticle, and etch processing models, tapering challenges and bend loss minimization. Methods presented in this disclosure are also applicable to the design and analysis of MEMS VLSI designs and microfluidics layouts, as these layouts also have non-Manhattan and curvilinear structures.

In some examples of the disclosed technology, algebraic geometry (e.g., Gröbner basis methods) can be used to solve many of the design and analysis problems of array waveguides. In some examples of the disclosed technology, the design of array waveguide layouts using parametric and algebraic representations (similar to the ones used in other photonics systems such as visual automated nanophotonic design and layout (VANDAL), IPKISS, and OIL) are employed, as opposed to vector or raster representations. Using symbolic representations allows for the use of computerized analysis. Moreover, it also allows for retargeting of waveguide designs to different technology process (such as a manufacturing node reduction from 20 to 16 nm).

Silicon photonics with particular emphasis on the design of waveguides, the silicon photonic structure, are disclosed with reference to the illustrated techniques. Mathematical techniques of affine varieties, polynomials, Gröbner basis and implicitization as can be applied to design and analysis of silicon photonics are disclosed. In some instances, the descriptions are based on assumed isotropic and nonmagnetic materials, although the disclosed techniques can be readily extended to other types of materials.

III. Example Silicon Photonic Devices

Two predominant structures in integrated silicon photonics are photonic index wires, and photonic band gap (PBG) waveguides. Waveguides function by guiding light through total internal reflection based on the contrast in the refractive index of the waveguide core and the surrounding cladding. As described, semiconductor to air, or semiconductor to silica contrasts are obtainable for waveguides smaller than 500 nm. The refractive index of SOI semiconductor is n=3.45, silica is n=1.45, and that of air is n=1.0.

Photonic index wires include photonic waveguides that have a width of 300-400 nm, and light is confined and guided using total internal reflection. Performance of photonic index wires is limited by line-edge roughness, and thus accurate modeling of silicon processing steps and their optimization are crucial to achieving good performance. PBG crystals are periodic structures which have high refractive index. They guide light on their line defect. Accurate manufacturing of photonic wires as well as PBG requires careful consideration of lithographic, resist models as well as mask manufacturing.

Using array wave guides along with grating couplers and diffraction systems, a wide variety of processing elements have been designed. These include wavelength multiplexing and demultiplexing circuits, and N×N star couplers.

Array waveguide gratings (AWG) are planar devices that are based on an array of waveguides with imaging and dispersive properties. A schematic 100 of an AWG is shown in FIG. 1. A beam of light entering in an input circle 110 propagates through the free propagation region 120 and is no longer confined, thus it diverges. On arriving at the input aperture 130 of the waveguide array 140 it is coupled onto the waveguide and propagates through the individual waveguides 145, 146, and 147 to an output circle 150. The length of the array waveguide is carefully chosen such that the optical path difference ΔL is calculated as $$\Delta L = m \frac{\lambda_c}{N_{\textit{eff}}}$$

where ΔL denotes the optical path difference between adjacent waveguides, $\lambda_c$ is the central wavelength, and $N_{\textit{eff}}$ is the effective index of the system. The optical path difference can be made an integer (m) multiple of the central wavelength. The input aperture can be analyzed as a confocal arrangement of two circles with a periodic array of radial waveguides. As each confocal circle contains the center of the other, they can be related by a Fourier transform. As shown in FIG. 1, the periodic waveguide array 140 consists of tapered waveguides formed between two reference circles 110 and 150. The impulse response of this Fourier transformation, along with the optical path length difference, are parameters of the AWG. Using the AWG as a building block, complex photonic circuits such as wavelength division multiplexing (WDM) switches, routers, multiplexers, optical switches, couplers, add-drop switches, and many more can be constructed.

IV. Example Applications of the Disclosed Technology

Consider the design of the waveguide array 140 as shown in FIG. 1. Analysis and optimization of this structure (e.g., for use in lithography-based manufacturing) includes applications to the following problems.

Figure 2B:
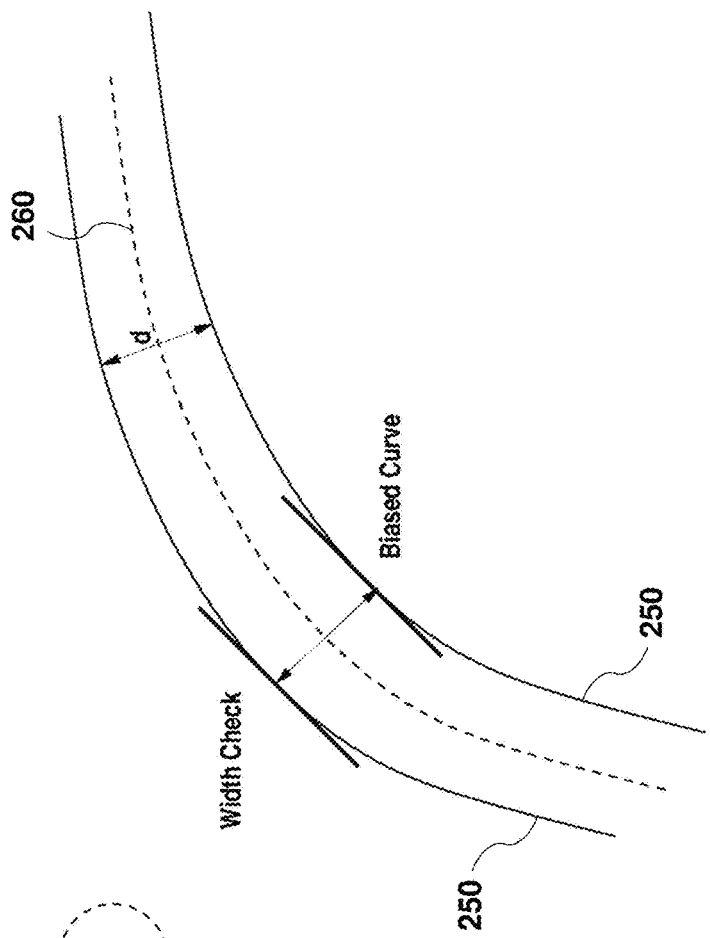
FIGS. 2A-2B illustrate an example tangent space formation of an envelope (formed by the circle as a secondary curve) around a primary curve (shown as solid line), constant bias application, and minimum width checking of curves, as can be used in certain examples of the disclosed technology.
Figure 2A:
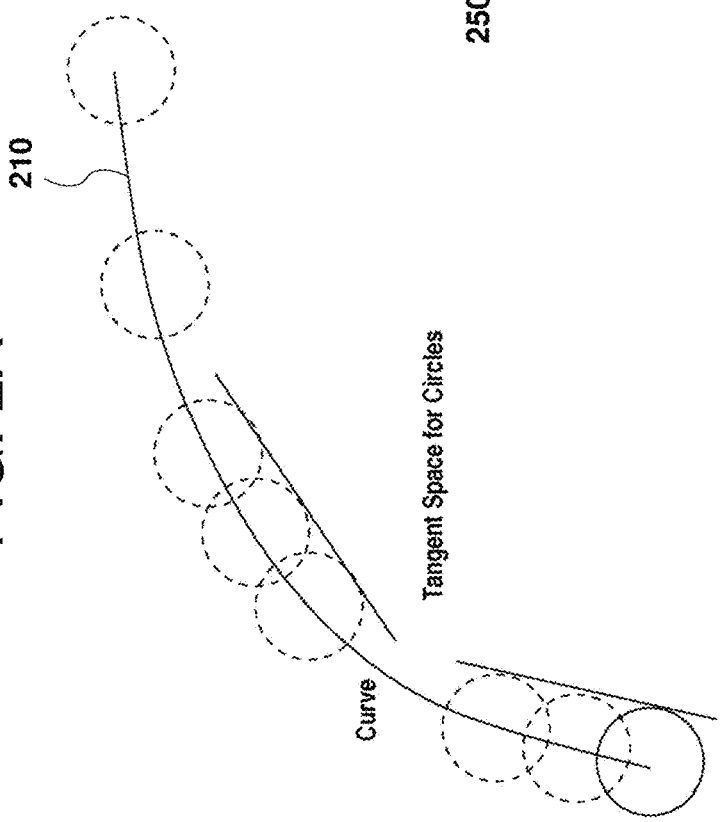

FIGS. 2A and 2B illustrate an example tangent space formation of an envelope (formed by the circle as a secondary curve) around a primary curve (shown as solid line), constant bias application, and minimum width checking of curves.

A. Envelope Creation and Singularity Detection

Although the waveguide curve can be specified in a computer as an ideal zero width line, its manufacture as a photonic waveguide of a specific width (e.g., 100 nm) in CMOS VLSI can use a representation in GDSII or open artwork system interchange standard (OASIS) formats. These formats, which have their genesis in the design and manufacture of conventional rectilinear CMOS devices, do not have special constructs for curved surfaces. OASIS, can represent a piecewise linear (PWL) approximation to a curve, using a number of small, straight lines to represent a curve. OASIS does not have an arc representation. Mathematically, the operation of converting a zero width curve to a finite width representation can be modeled as a tangent surface formulation, or equivalently as a Minkowski operation.

The conversion of the curve 210 in FIG. 2A to its 2-D realization can be implemented as a tangent space surface conversion, as shown. It should be noted that creation of a 2-D tangent surface can lead to the formation of singularities. The construction of the tangent surface (called the envelope) and the checking of singularities is discussed in further detail below

B. Manufacturability Checking

Given a computer representation of the waveguide array and the CMOS process in which it is to be manufactured, the geometrical realization is typically checked for manufacturability, a process known as design rule check (DRC). Since the layout of the waveguide array comprises of many curvilinear segments, this is a nontrivial task. The DRC dimensional checks can include, for example, spacing, minimum width, and enclosure checks. An example of a minimum width DRC for the curve 210 is shown in FIG. 2B. The minimum width of the envelope formed by the tangent space circles is checked to ensure that the minimum width d of an envelope 250 is not smaller than a predetermined value anywhere along the envelope. Additional checks can include mask manufacturing rule checks (MRC), such as resolution snapping. In some examples of the disclosed technology, a method represents waveguide curves using parameterized rational curves, and quantifier elimination (QE) is used to perform spacing, width, and various other checks on waveguide curves, as described in further detail below.

C. Process Modeling and Bias Optimization

Modeling of isolated waveguide wires can account for process- and geometry-dependent biases. A bias is a Minkowski-type addition (dilation) or subtraction used to compensate for the manufacturing process. An example is shown in FIG. 2B. Accurate calculation of bias for curvilinear shapes is nontrivial, as maintaining topological consistency of the output is complicated by the creation of singularities. At the same time, structures such as ribwaveguides, require accurate overlay processing for manufacturing the raised rib. One suitable representation of waveguides is parametric in t as x=f(t), y=g(t), thus, if curve $c_1(t)=(f_1(t), g_1(t))$ is overlapped with curve $c_2(t)=(f_2(t), g_2(t))$, a parametric representation of $c_1 \char`\^ c_2$ can be directly computed. Disclosed methods of calculating offsets of parametric curves are presented below.

D. Mask Optimization

Different representations of the same curve in VLSI layout can cause large variations in the number of mask data preparation shots needed to image the shape of the curve onto the silicon wafer, which in turn can cause large performance degradation in the waveguide. Earlier mask writers used circular beams, but modern writers are trapezoid-based (an example of a variable-shape beam). Thus, careful optimization of the generated curve prior to a PWL output in GDSII or OASIS is recommended. Using the disclosed methods of parametric representation, mask data preparation operations are simplified considerably, as the instantaneous curvature (at t) of the primary curve determines the trapezoid slopes completely, and the tangent lines of the envelope can be exactly computed for every $x(t)$, $y(t)$ location.

E. Optimization of Wave Guides

Figure 3B:
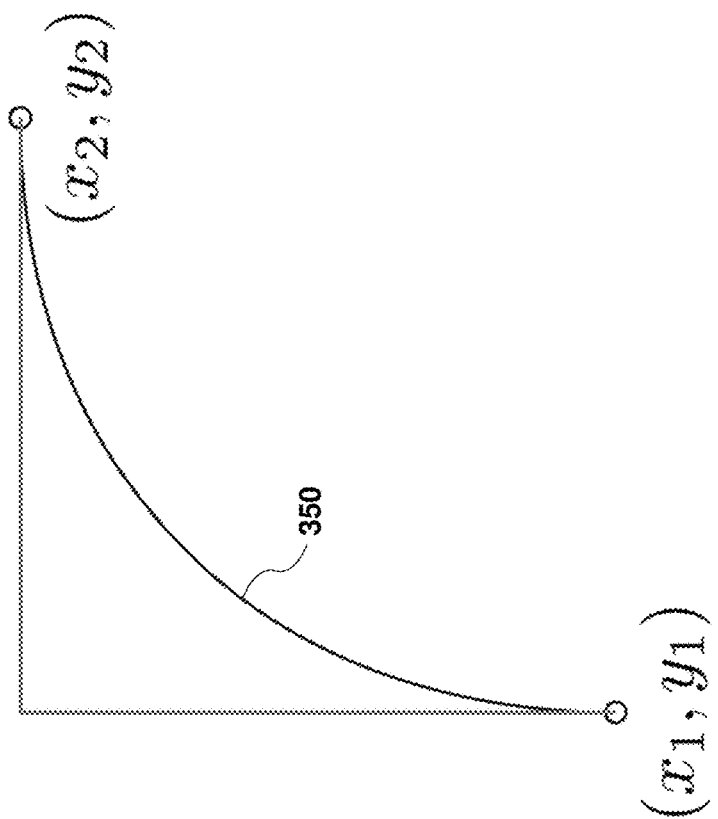
FIGS. 3A-3B illustrate an example bend contour optimization for waveguides. In particular.
Figure 3A:
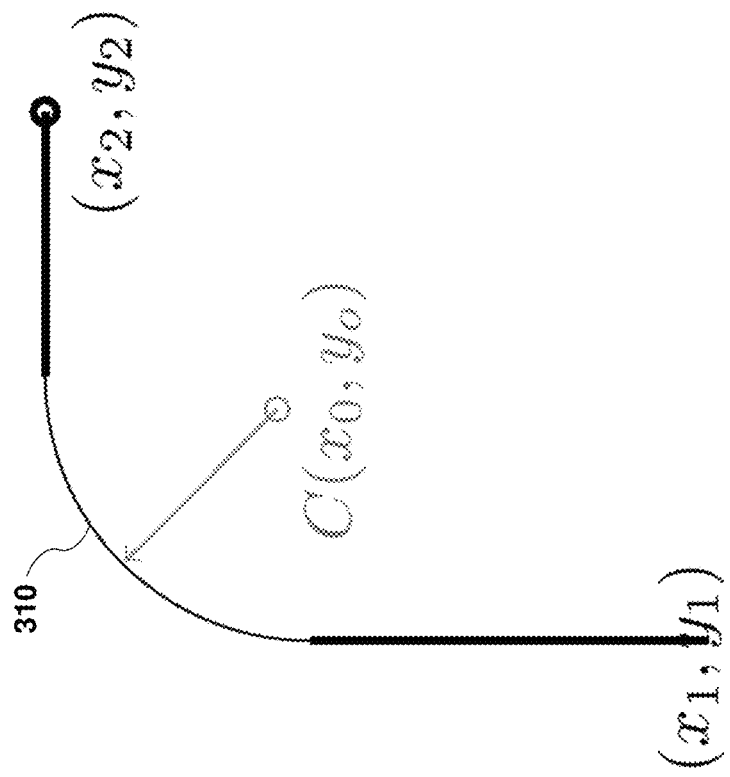

The shape of waveguide curve can be tuned using the disclosed technology to reduce detrimental effects such as bend loss and junction loss. Since waveguides and couplers are used for optical transport, they are often provided as primitive building blocks in photonics process design kits (PDK). Loss minimization for bends can be performed various techniques such as contour-optimized bends, optimal constant width bends, and adiabatic bends to alleviate the bend loss problem. FIGS. 3A-3B illustrate an example bend contour optimization for waveguides. In particular, FIG. 3A illustrates a circular bend 310 of 90° and FIG. 3B illustrates an adiabatic bend 350 of 90°. In both cases, the optical signal is transported within the waveguide from point $(x_1, y_1)$ to $(x_2, y_2)$.

The adiabatic bend shown in FIG. 3B is generated using a Bezier curve. Optimizations using Bezier curves are discussed further below. In the illustrated example, using an adiabatic bend for a 3 μm bend radius, reduced the bend loss from 0.037 to 0.009 dB. Other aspects of design optimization are curvature minimization, and the design of adiabatic tapers, diffraction gratings, and optimization of wavelength independent fundamental modes.

V. Mathematical Explanation of Aspects of the Disclosed Technology

Unless otherwise stated, we consider the field of complex numbers $\mathbb{C}$ as the underlying field for the discussion (however, the plots are drawn in the real field $\mathbb{R}$ for ease of explanation).

A monomial in $x_1, x_2, \ldots, x_n$, is a product of the form $$x_1^{\alpha_1} x_2^{\alpha_2} \ldots x_n^{\alpha_n}.$$

Thus, polynomials in n variables with coefficient in an arbitrary field k are finite linear combinations of monomials $$f = \Sigma c_k x_1^{\alpha_1} x_2^{\alpha_2} \ldots x_n^{\alpha_n}$$

where $c_k$ is a coefficient in field k.

A. Affine Varieties

Using the definition of polynomials, we can define affine varieties of polynomials $f_1, f_2, \ldots, f_s$ as $\mathbb{V}$ $$\mathbb{V}(f_1, f_2, \ldots, f_s) \subset k^n$$

is the set of all solutions to the system of s equations $f_1(x_1, x_2, \ldots, x_n) = f_s(x_1, x_2, \ldots, x_n) = 0$. As an example, the 2-D unit circle is the affine variety corresponding to $$\mathbb{V}(x^2+y^2-1)$$

since $x^2+y^2=1$ for the unit circle. In general, for any graph of a rational function, $y=f(x)$, its corresponding affine variety is $\mathbb{V}(y-f(x))$.

B. Parametric Curves

Since in our application domain, there are a relatively small number of variables, x and y are used for the variables in this particular example. We use t as an auxiliary variable for parametric curves. Consider the parametric curved defined as $$x=2+t, y=8-t^2. \quad \text{(Eq. 3)}$$

Eliminating t as x−2 and substituting for y, producing $$y=-x^2+4x+4. \quad \text{(Eq. 4)}$$

The affine variety corresponding to this curve is given as $$V(y+x^2-4x-4).$$

Figure 4A:
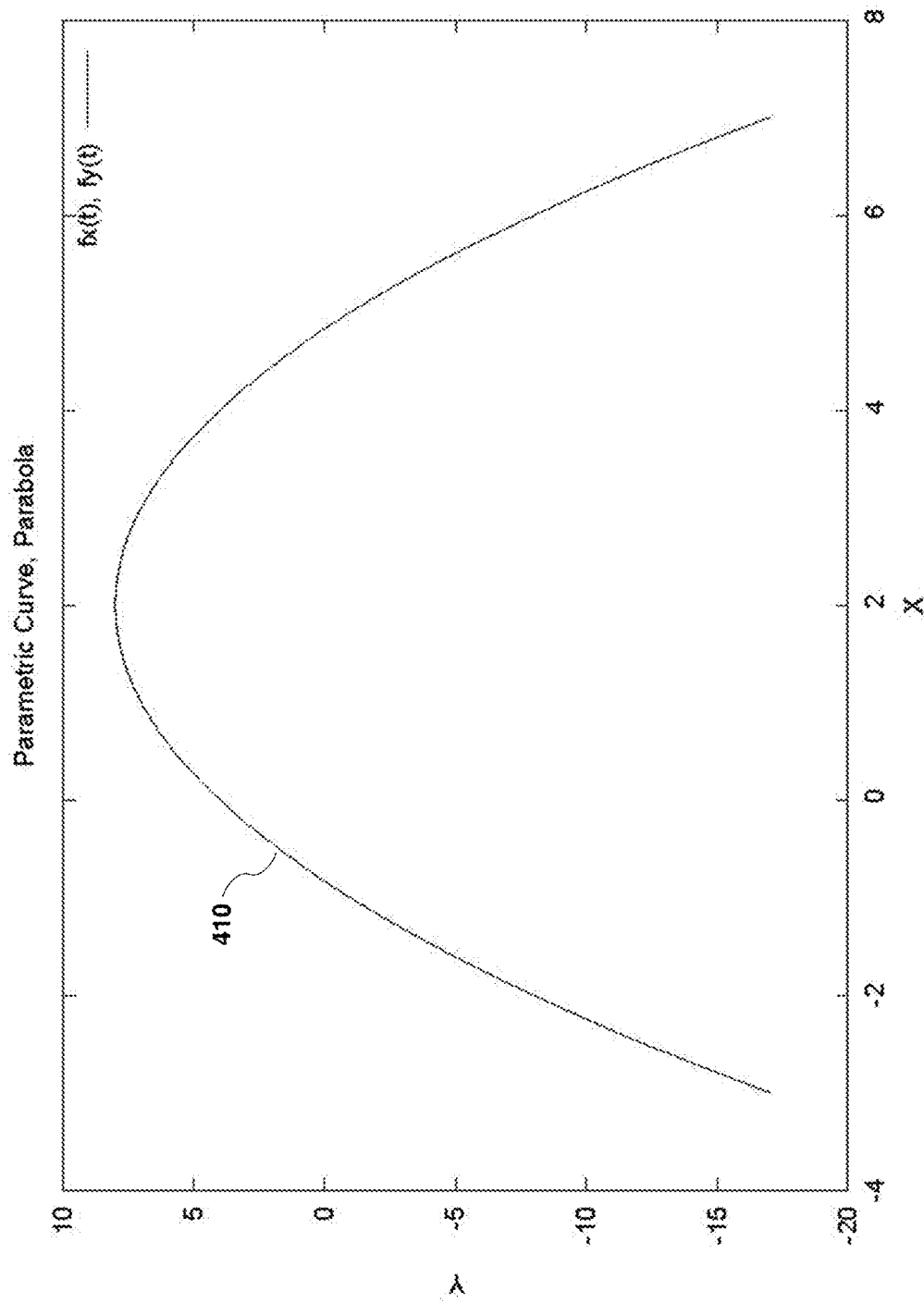

The corresponding curve 410 itself is shown in FIG. 4A.

C. Using Bezier Curves

Consider the parametric curve 750 shown in FIG. 4B. The curve 450 is an example of a Bezier curve and can be parameterized as $$x=(1-t)^3 x_0 + 3t(1-t)^2 x_1 + 3t^2(1-t) x_2 + t^3 x_3$$

$$y=(1-t)^3 y_0 + 3t(1-t)^2 y_1 + 3t^2(1-t) y_2 + t^3 y_3.$$

Many of the actual waveguides in current photonics chips can be modeled with the above parametric curves, or combinations thereof.

D. Implicitization

The nonparametric form of the curve is known as the implicit form. While the parametric form is useful for computer plotting, the implicit form can be used to answer point-on-curve queries. For example, given the curve of (Eq. 4), we would like to check if the point (−2, 0) lies on the curve. Given the parametric form, the following system of equations can be solved:

$$-2=2+t \quad \text{(Eq. 5)}$$

$$0=8-t^2 \quad \text{(Eq. 6)}$$

for t within the given range. However, given the implicit form $$y=-x^2+4x+4 \quad \text{(Eq. 7)}$$

the value x=−2 can be applied and verified that y=−8≠0, thus the point (−2, 0), does not lie on the curve. The process of converting a parametric curve to its implicit form is called implicitization, and for rational curves, as used in photonic waveguides, implicitization can be performed efficiently.

E. Rectification

Since a primary function of a waveguide array is to introduce an optical path length difference ΔL between adjacent waveguides, the length of individual wires needs to be calculated and designed correctly. The small variations caused by CMOS manufacturing also need to be controlled tightly as line edge roughness can cause leakage of light, reducing the power transferred. Given a parametric curve 510 denoting the curve of the waveguide, the calculation of its length is called rectification. For rational curves, the length is finite and can be calculated using a piecewise linear (PWL) approximation or calculus.

Figure 5:
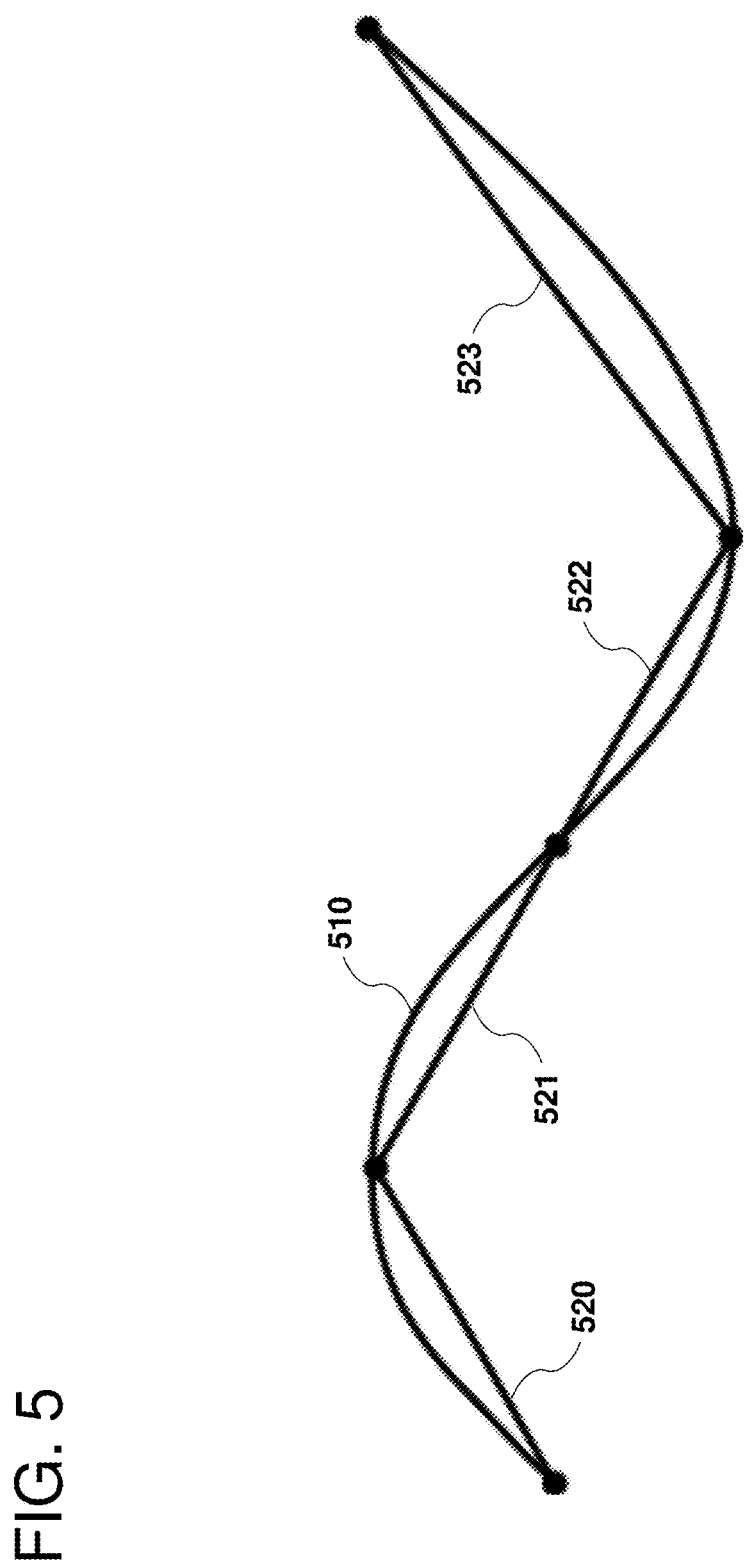
FIG. 5 illustrates an example piecewise linear approximation for rectification, as can be used in certain examples of the disclosed technology.

Using PWL, the curve is approximated by a sequence of straight line segments 520-530 as shown in FIG. 5. The points for the segments are chosen on a uniform basis (e.g., based on an expected degree of the curve). The number of points may have to be increased if the curve intersects the segments. Given the sequence of points, the length is calculated using the Pythagoras theorem as $\Sigma_i\sqrt{\Delta x_i^2+\Delta y_i^2}$ where $\Delta x_i$ is the difference in x coordinate, and $\Delta y_i$ is the difference in y coordinate between adjacent points, respectively. As the number of segments approximating the curve increases, the PWL length approximates the true length closely.

An alternate method uses calculus. If y=f(x) represents the function, and f(x) as well as f (x), are continuous in the range [a,b] of interest, then the length of the curve y=f(x) between x=a and x=b is $$s=\int_a^b\sqrt{1+[f'(x)]^2}dx \qquad \text{(Eq. 8)}$$

if the curve is defined using a parameter t with x=fx(t), and y=fy(t) [as shown in (3)], then the length of the curve is $$s=\int_a^b\sqrt{[fx'(t)]^2+[fy'(t)]^2}dt. \qquad \text{(Eq. 9)}$$

The length of the curve is an intrinsic measure, and is independent of the parameterization used. For the curve shown in FIG. 4A given by $y=-x^2+4x+4$, dy/dx=−2x+4, the length of the parabola from X=[−2, 2] can be calculated from (Eq. 8)

$$s=\int_{-2}^{2}\sqrt{1+(4-2x)^2}dx. \qquad \text{(Eq. 10)}$$

A numerical evaluation gives the length of the curve to be 16.818 units. The above example shows, that in general, calculating the arc length of curves is nontrivial. The calculus-based method can be used to calculate optimal waveguide bends with constant width. In practice, computing the length of a waveguide accurately is nontrivial. If the length is calculated as a half-perimeter (minus the width of both ends), then during the process of converting the curve to vector or raster formats, the length of the curve can be significantly perturbed with observed errors of 10% or more.

F. Ideals

If $f_1, f_2, \ldots, f_s$ are polynomials in n variables and using the definition of affine variety, the ideal generated by $<f_1, f_2, \ldots, f_s>$ satisfies the properties of ideals. A subset I is called an ideal if:

1) $0 \subset I$;
2) if $f,g \subset I$ then $f+g \subset I$; and
3) if $f \subset I$ and h is a rational function in field k of n variables, then $hf \subset I$.

The ideal generated by a finite number of polynomials is a simple example, and also one which allows us to reason about affine varieties. An ideal can be said to be finitely generated, if there exist polynomials $<f_1, f_2, \ldots, f_s> \in [x_1, x_2, \ldots, x_n]$, such that $I=<f_1, f_2, \ldots, f_s>$. Then, the polynomials $f_1, f_2, \ldots, f_s$, are called the basis of I. A given ideal may have many bases, and in the next section, we describe a particularly useful basis, the Gröbner basis.

VI. Gröbner Basis

Given an ideal $I \subset k[x]$, we know that $I=<g>$ for some $g \in k[x]$ (polynomial of single variable in the field k). Given $f \in k[x]$, to check whether $f \in I$ (ideal membership problem), we divide f by g $$f=q \cdot g+r$$

where q, $r \in k[x]$, then $f \in I$ if and only if, r=0. This relationship can be generalized to multiple variables.

A. Lexical Ordering of Monomials

Given n variables in $k[x_n]$, we order the variables in the monomial in lexical order such that $x_1>x_2> \ldots >x_n$. Given a monomial order, we can define multidegree of f, leading coefficient, and leading monomial.

B. Buchberger's Algorithm

Given a division algorithm for polynomials, we can use the greatest common divisor (GCD) algorithm to calculate $gcd(f_1/f_2)$. For a fixed monomial order a finite subset $G=g_1, g_2, \ldots, g_t$ of an ideal I is called a Gröbner basis if and only if the leading term of any element of I is divisible by one of the leading terms of any $g_i$. Consider two polynomials $$f_1=x^3-2xy \qquad \text{(Eq. 11)}$$

$$f_2=x^2-2y^2+x. \qquad \text{(Eq. 12)}$$

Using the computer algebra system REDUCE, the Gröbner basis can be calculated using the instructions below in Listing 1:

LISTING 1

```
load_package groebner;
torder({ },lex);
f1 : = x^3 − 2xy;
f2 : = x^2 − 2y^2 + x;
groebner{f1,f2};
{ x − 2y^2, y^3 }
torder({ },gradlex);
groebner{f1,f2};
{ x^2,xy, 2y^2−x }.
```

Thus the Gröbner basis of polynomials shown in (Eq. 11) and (Eq. 12), using lex order is $\{x-2y^2, y^3\}$ and using the gradlex order, the Gröbner basis is $\{x^2, xy, 2y^2-x\}$. The implementation of Gröbner basis in REDUCE uses Buchberger's algorithm. Since g is a list of polynomials which represents the ideal I, checking $f \in I$ is equivalent to dividing f by g and checking whether the remainder is zero or not.

VII. Example Method of Using Gröbner Basis

In this section, an exemplary method of using a Gröbner basis to propose solutions to the design and analysis problems of silicon photonics array waveguide is disclosed. The exemplary method can be used for component designers to incorporate our algebraic geometry checks as parameter self-consistency checks. Larger photonic primitives such as WDM, resonators, S-bend connectors, couplers, and tapers, provided in photonic PDKs and libraries, often have about 15-40 parameters. The feasible region, where a combination of these parameters yields a correctly functioning photonic device, is nontrivial to estimate, and computationally expensive to verify by running traditional layout verification software such as DRC. By employing the disclosed method into a PDK component description, a self-consistency check can be developed elegantly.

Another application of the disclosed technology is for top-level analysis of a photonic system that is hierarchically composed of primitive building blocks. Each primitive has with it, an associated algebraic geometry model. The model is consistent with (and dependent on) the parameters of the primitive component. The model can be inspected to yield the bounding-box or minimum rectilinear extent; this is used to perform an efficient filtering of data before QE checks for DRC are performed. In some of the disclosed methods, computational requirements are similar. In some implementations, the method requires a polynomial and rational arithmetic library. Gröbner basis calculations are not needed if the set of allowed parametric functions are fixed; then the Gröbner basis can be precalculated and stored. As the parametric curves are rational, differentiation operators are easy to compute.

A. Construction of Envelopes

Above, we have seen examples of parametric curves, which in theory could be used to form waveguides. But since the waveguides have a finite width, an expansion of the curve using either a circle or square shape is performed. We first consider a basic envelope that is created by moving a circle of radius r=2 on the line y=x. The locus of a circle which moves on this line can be given as $$F = (x-t)^2 + (y-t)^2 - 4 = 0 \quad \text{(Eq. 13)}$$
$$= 2t^2 - 2tx - 2ty + x^2 + y^2 - 4 = 0.$$

One can calculate $$\frac{\partial}{\partial t} F = 2(2t - x - y). \quad \text{(Eq. 14)}$$

Equation (13) describes the family of circles of radius r=2 in $R^2$ whose centers lie on the curve defined by y=x. The parametric curve family 610 illustrated in FIG. 6A. The boundary of this family of curves is simultaneously tangent to all circles in the family. This tangent space is called the envelope of the parametric curve. The envelope is a single curve that is tangent to all the curves in the family, as shown in FIG. 6B.

Given a polynomial $F \in \mathbb{R}[x, y, t]$ the variety in $R^2$ defined by $F(x, y, t)=0$ is denoted $V(F_1)$, and the family of curves determined by F consists of the varieties $V(F_t)$ as t varies over $\mathbb{R}$. Thus, given a family $V(F_t)$ of curves in $R^2$, its envelope consists of all points $(x, y) \in R^2$ satisfying $$F(x, y, t) = 0$$
$$\frac{\partial}{\partial t} F(x, y, t) = 0.$$

Equation (16) can be thought as the condition for the tangent [defined by f'(t)]. The Gröbner basis can be calculated (e.g., using REDUCE) of F, ∂F to get $$\{g_1: 2t-x-y,\ g_2: x^2-2xy+y^2-8\}.$$

Since $g_2$ is independent of t, it is the elimination ideal, and gives the tangent space.

Next, a slightly more complex example is evaluated. Consider a parametric curve $$x=t,\ y=4t^2+3t+8. \quad \text{(Eq. 17)}$$

Next, if we consider the envelope formed by moving a circle in $R^2$ on this curve, the following locus equation is produced:

$$(x-t)^2+(y-4t^2-3t-8)^2=r^2. \quad \text{(Eq. 18)}$$

Using (15) and (16), for the parametric curve defined in (Eq. 17), the following are produced:

$$F = (x-t)^2 + (y - 4t^2 - 3t - 8)^2 - r^2 = 0$$
$$\frac{\partial}{\partial t} F = -2(x-t) + 2(-8t-3)(y - 4t^2 - 3t - 8) = 0.$$

To compute the equation of the envelope, the Gröbner basis is used. Using lexicographic order t>x>y, a Gröbner basis for the above system of equations is given by (for a specified r=2)

$$(y-4t^2-3t-8)^2+(x-t)^2-4 \quad \text{p1:}$$

$$2(-8t-3)(y-4t^2-3t-8)-2(x-t) \quad \text{p2:}$$

poly_reduced_grobner ([p1,p2],[t,x,y]);

One of the returned basis gives us the elimination ideal, $g_1$ which does not depend on t. Since $g_2$ is independent of t, it is the elimination ideal, and gives the tangent space.

Next, a slightly more complex example is examined. Consider a parametric curve:

$$x=t,\ y=4t^2+3t+8. \quad \text{(Eq. 17)}$$

Next, if the envelope formed by moving a circle in $R^2$ on this curve is considered, the following locus equation is produced:

$$(x-t)^2+(y-4t^2-3t-8)^2=r^2. \quad \text{(Eq. 18)}$$

Using (Eq. 15) and (Eq. 16), for the parametric curve defined in (Eq. 17), the following are produced:

$$F = (x-t)^2 + (y - 4t^2 - 3t - 8)^2 - r^2 = 0$$
$$\frac{\partial}{\partial t} F = -2(x-t) + 2(-8t-3)(y - 4t^2 - 3t - 8) = 0.$$

To computer the equation of the envelope, the Gröbner basis is used. Using lexicographic order t>x>y, a Gröbner basis for the above system of equations is given by (for a specified r=2)

$$(y-4t^2-3t-8)^2+(x-t)^2-4 \quad \text{p1:}$$

$$2(-8t-3)(y-4t^2-3t-8)-2(x-t) \quad \text{p2:}$$

poly_reduced_grobner ([p1,p2],[t,x,y]);

One of the returned basis gives us the elimination ideal, $g_1$ which does not depend on t.

B. Singularity Detection

Computational geometry software, especially scanline-based software, is very sensitive to lap-count errors. Lap count is defined on a scanline (assumed to be vertical from y=[−∞: ∞]); as we walk up the scanline, the lap count is increased every time we enter a closed Jordan curve, and decreased when we exit it. By definition, the lap count starts at zero and for a well-ordered scanline, will exit at zero count as well. When a shape is self-intersecting, the lap count has to be carefully modified using the winding number, a concept introduced to computational geometry from complex analysis. For self-intersecting curves, points of singularity, where lap counts have to be corrected explicitly, can be defined as discussed below. Consider the curve $y^2=x^2(1+x)$ shown in FIG. 7. We define the singularity point as the point on the curve V(f) such that the tangent line fails to exist. Calculating singularity is done by intersecting V(f) by a line L and calculating the gradient ∇f.

The singular points off can be determined by solving the equations $$f = \frac{\partial}{\partial x} f = \frac{\partial}{\partial y} f = 0.$$

Figure 7:
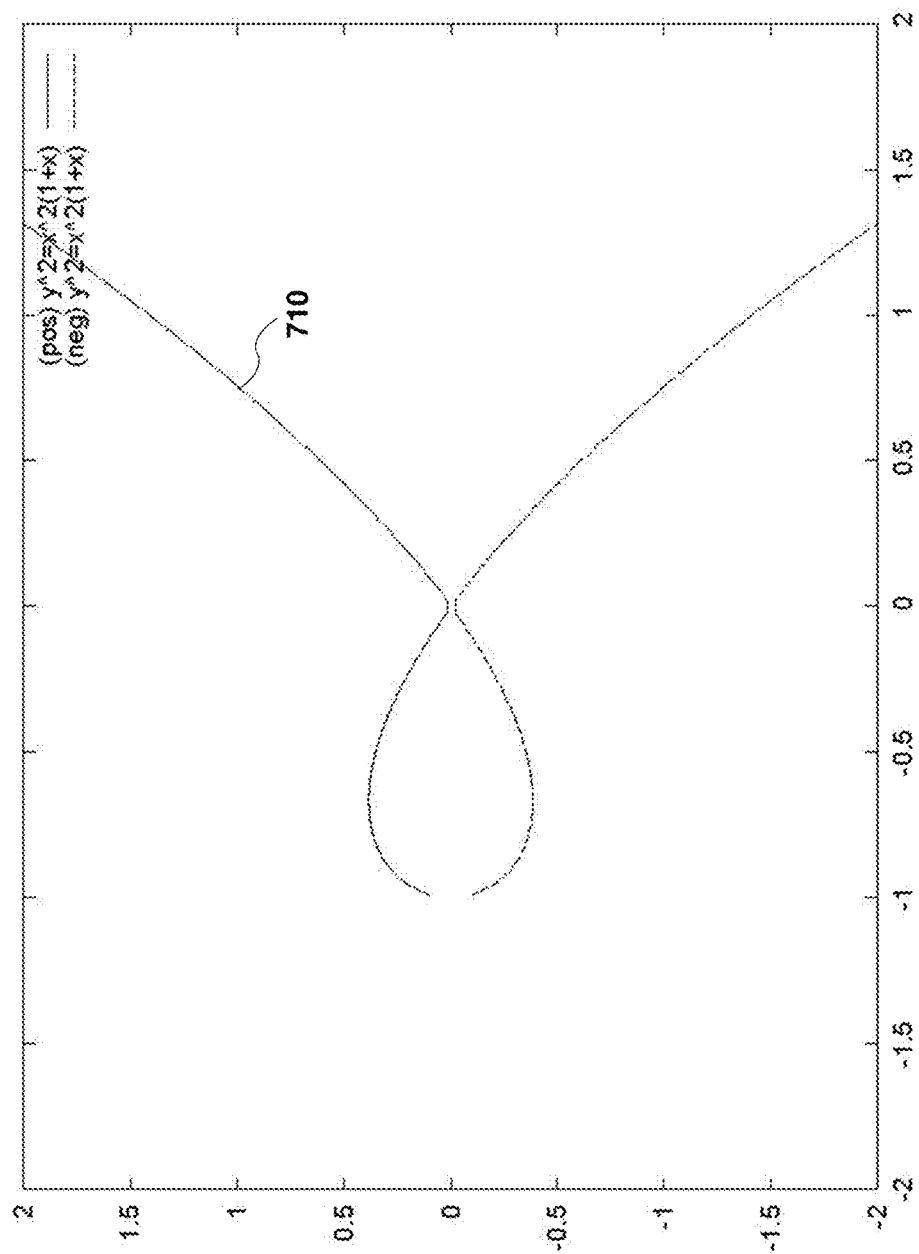
FIG. 7 illustrates a singular curve $y^2=x^2(1+x)$, as can be used in certain examples of the disclosed technology.

For the curve 710 $y^2=x^2(1+x)$ shown in the chart 700 of FIG. 7, we get $$f : y^2 = x^2(1+x) \quad (19)$$

$$\frac{\partial}{\partial x} f = -2x - 3x^2 = 0 \quad (20)$$

$$\frac{\partial}{\partial y} f = 2y = 0. \quad (21)$$

Equations (19)-(21) can be solved using Gröbner basis methods and we see that the point (0, 0) is the only point of singularity of this curve. This method is generally applicable to algebraic curves, and thus can be used for array waveguide curves as well.

C. Manufacturability Checks

Consider two curves $C_1$ and $C_2$. Let us assume that $C_1$ and $C_2$ are parametric curves of the envelopes of waveguides and a check to determine if the minimum Euclidean distance between any two points on each curve is smaller than a manufacturable limit. Using mathematical notation this check can be expressed as $$\exists (x_1,y_1) \in C_1, (x_2,y_2) \in C_2 : (x_1-x_2)^2 + (y_1-y_2)^2 < D^2$$

where $D^2$ represents the square of the constraint. Such existence queries can be efficiently solved using the method of QE.

The envelope $C_1'$ ($C_2'$) of $C_1$ ($C_2$) is created with a circle of radius D. Given parametric representation of $C_1$ as $f_{1x}(t_1), f_{1y}(t_1)$ with $t_1:[q_{11}:q_{12}]$ and similarly for $C_2 f_{2x}(t_2), f_{2y}(t_2)$ with $t_2:[q_{21}:q_{22}]$, the minimum spacing check can be written as a sentence:

$$(\exists t)(\exists x)(\exists y) st$$

$$:q_{11} \le t \le q_{12}$$

$$:q_{21} \le t \le q_{22}$$

$$:x=f_{1x}(t)=f_{2x}(t)$$

$$:y=f_{1y}(t)=f_{2y}(t).$$

These formulas can be entered into QEPCAD as prenex formulas. A partial CAD of the configuration space is created, and proves whether a solution can exist in each of the cells or not. Consider the sentence $(\exists x)(\exists y) F(x, y)$. The key idea of using partial CAD is based on the observation that a decomposition $D_1$ of $R^1$ can be lifted to $R^2$ by constructing a stack of cells in the cylinder over each cell of $D_1$. Each cell has a TRUE or FALSE value depending on F. Rather than construct all cells of $D_1$, each cell is constructed in sequence and the method aborts the CAD as soon as $(\exists x)(\exists y)F(x, y)$ becomes TRUE. Using QE for manufacturability checks can be used with rational parametric curves to design photonic waveguides.

Even if the parameterized curves $C'_1$ and $C'_2$ are not available readily, CAD can be used as follows:

$$(\exists t_1)(\exists t_2)(\exists x)(\exists y) st$$

$$:q_{11} \le t_1 \le q_{12}$$

$$:q_{21} \le t_2 \le q_{22}$$

$$:(f_{1x}(t_1)-f_{2x}(t_2))^2 + (f_{1y}(t_1)-f_{2y}(t_2))^2 < D^2.$$

Primary curves are used with $t_1$ and $t_2$ parameters and the Euclidean distance between the curves is checked. Using $C_1$ and $C_2$ increases the number of variables in the algebraic decomposition by a factor of two, and moreover, these curves cannot be used to check minimum width, enclosure, MRC, and grid snapping (resolution) checks.

D. Bias Application

In many examples, lithographic correction is applied to isolated lines in the form of applied bias. For rectilinear polygons, application of bias (both positive and negative), is relatively straightforward, but even for PWL polygons with all-angle edges, the behavior of biasing for acute angles is carefully monitored, lest the output polygon become self-intersecting. When dealing with curvilinear shapes such as waveguides, this problem is exaggerated. In such cases, the application of good local behavior of an offset to an algebraic curve can be used. Such techniques are based on the equality of the topology of the biased curve to the original curve. However, the degree of the resulting polynomial of the offset has high degree, as compared to the original curve. In some examples, a trimmed offset is used, where certain branches of the biased shape are discarded. Such closed form expressions of the offset can be very useful when retargeting the waveguides curves from one technology node to another. A table of such functions that can be built using Gröbner basis methods is described above.

VIII. Example Implementation and Corresponding Experimental Data

Figure 8:
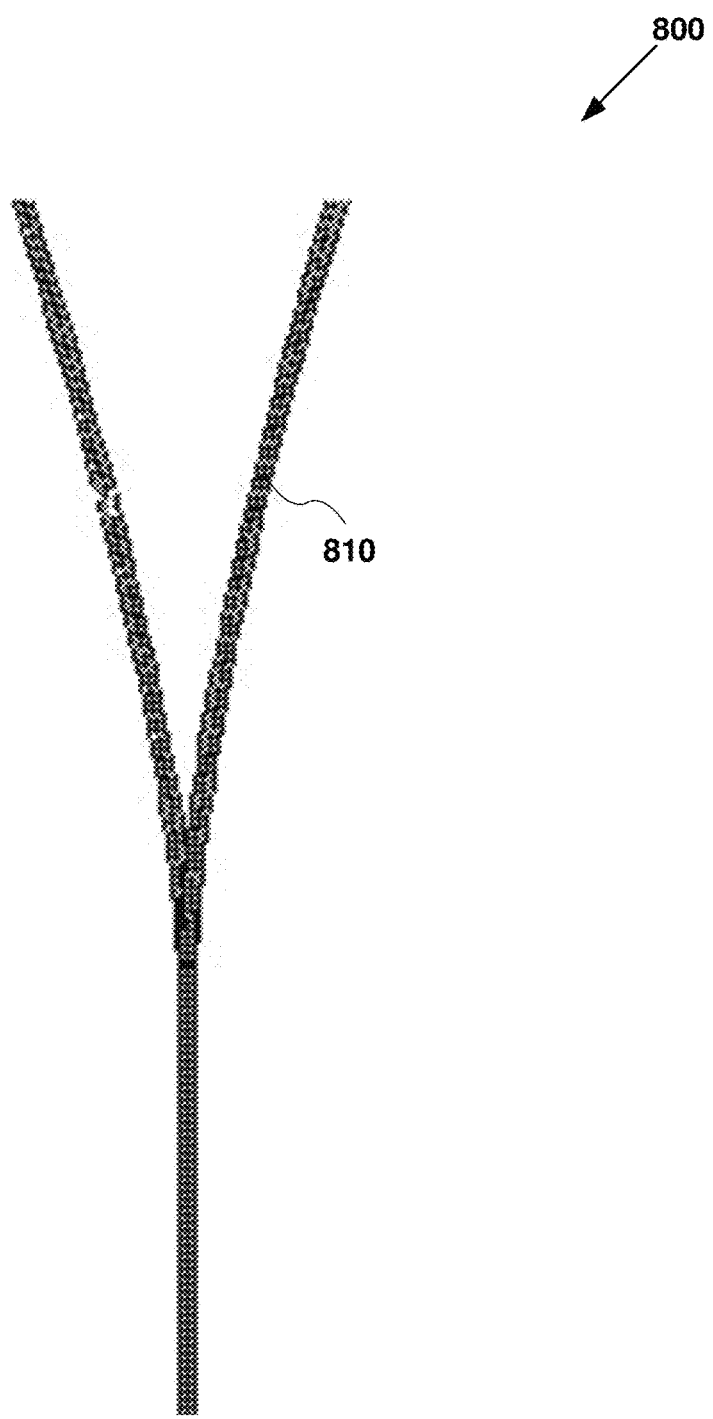
FIG. 8 depicts a Y-junction component, as can be used in certain examples of the disclosed technology

We have performed experiments with the Gröbner basis methods presented in this paper, and implemented a parametric curve processing system which accepts control file input in the form shown below in Listing 2. A corresponding generated mask layout feature 810 is shown in FIG. 8.

| LISTING 2 |
|---|
| # comment: this is a Y-junction example<br>begin design Y-junction<br>G left_branch −105 0 100 40 49<br>P x = 3 0.5 −1 1 0 P<br>y = 2 100 10 0<br>endg<br>G right_branch 0 105 100 40 49<br>P x = 3 0.5 −1 1 0 P<br>y = 2 100 10 0<br>endg<br>G line0 −1000 0 10 42 49<br>P x = 1 0 0<br>P y = 1 1000 1000<br>endg<br>I left_branch 0 0 0<br>I right_branch 0 0 0<br>I line0 0 0 0<br>end design. |

In the above Listing 2, G denotes a group identifier, which in turn can be comprised of primitive shapes such as trapezoids (subsumes rectangles and squares), and rational parametric curves of paired polynomials in x and y. Every group has exactly one paired polynomial. The syntax of the polynomial statement is P x=(or P y=), followed by the degree of the polynomial and a list of coefficients. The syntax of the group statement is G, name, starting range of the parameter, ending range, sampling frequency, envelope radius and curve mask layer. A group construct is terminated with endg. Groups can be instantiated with the I construct, which refers to the group name, rotation angle, and the x- and y-translation. Given these curves: the envelopes, singularities, and spacing checks can be performed as discussed above. For example, a Bezier curves can be represented as shown in Listing 3:

---
LISTING 3
---
```
G curve0 0 1 10 40 49
B 0 0 0 10 10 10 10 0
endg.
```
---

This defines the control points as (0, 0), (0, 10), (10, 10), and (10, 0). Internally the system constructs the parametric curve and uses that for computation. Specifically, calculation of bias on this representation is calculated by the program as $$B'=\text{bias}(B,d)$$

where B is the group representation of a Bezier curve. The disclosed system converts B to a parametric curve and computes new control points for the biased curve B'. This is done without conversion to vector or raster format.

A. Dimensional Checks Using QE

Dimensional checks can be used to verify that spacing constraints of the process rule deck are not violated in the design. Commonly used dimensional checks include: EXTERNAL, INTERNAL, and ENCLOSURE. Examples of these checks for rectilinear layout are shown in the layout 900 of FIG. 9A. This includes a first set of rectilinear polygons 910-912 on layer A and a second rectilinear polygon 920 on layer B. The direction of the edges can be calculated using vector geometry. The notation $\vec{u}$ is used to denote a unit normal vector. For minimum width, spacing, and enclosure checks, the role of DRC is to verify that no correctly facing edges in the layout are closer (using the Euclidean distance) than the specified rule distance. For an edge to be closer than $W_x$ there must exist points $(x_1, y_1)$ on the first envelope and $(x_2, y_2)$ on the second envelope whose Euclidean distance is smaller than $W_x$.

Figure 9B:
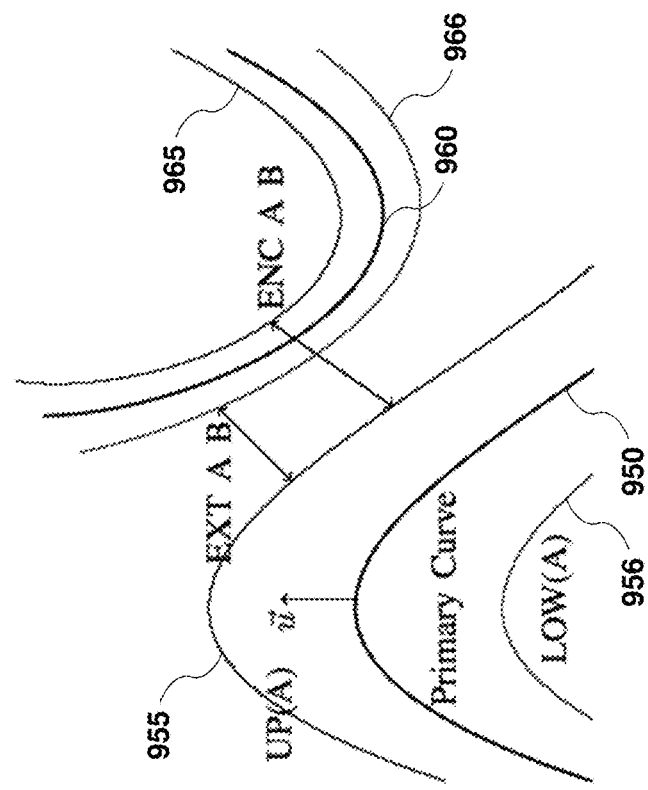
FIGS. 9A-9B illustrate dimensional check operators for layout verification, as can be performed in certain examples of the disclosed technology. In particular.
Figure 9A:
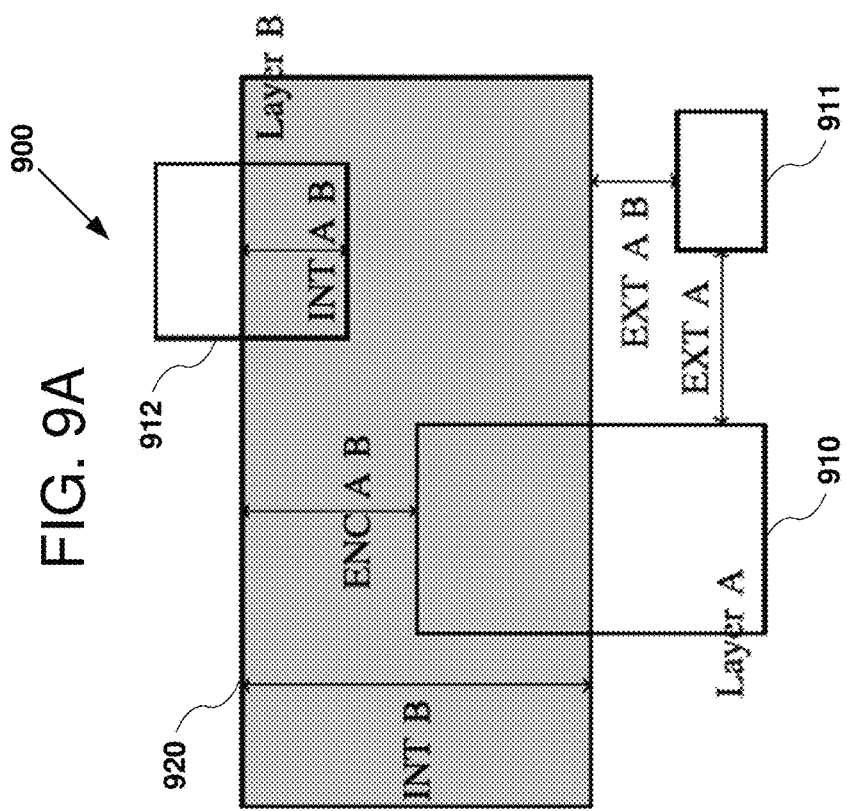

For parametric curves, the edge facing relations are calculated, as shown in FIG. 9B and listed in Table I. The directions of the normals for the curves A and B can be used in deciding if the curves are facing in a valid direction for the check.

TABLE I

DIMENSIONAL CHECK OPERATORS USING ENVELOPES

| Rule | Layer | Envelope | Normal ($\vec{u}$, $\vec{v}$) |
|---|---|---|---|
| EXTERNAL | A A | UP(A) LOW(A) | EXT(A) EXT(A) |
| EXTERNAL | A B | UP(A) LOW(B) | EXT(A) EXT(B) |
|  |  | LOW(A) UP(B) | EXT(A) EXT(B) |
| INTERNAL | A A | UP(A) LOW(A) | INT(A) INT(A) |
| INTERNAL | A B | UP(A) LOW(B) | INT(A) INT(B) |
|  |  | LOW(A) UP(B) | INT(A) INT(B) |
| ENCLOSURE | A B | UP(A) UP(B) | EXT(A) INT(B) |
|  |  | LOW(A) LOW(B) | EXT(A) INT(B) |

The upper envelope always lies above the primary curve (by definition), and thus spacing checks (for example) can be calculated as a constraint on the distance between the upper envelope of curve A [denoted UP(A)] and the lower envelope of curve B [denoted LOW(B)]. The curves A and B may be present on different layers, and it should be noted that the ENCLOSURE operator is noncommutative, as it measures the external facing contour of A with the inner facing contour of B.

In FIG. 9B the primary curves (950 and 960 for layers A and B, respectively), as well as the upper and lower envelopes (955 and 956, and 965 and 966, for layers A and B, respectively) are shown, as well as the contour pairs that are analyzed by the disclosed methods.

It should be noted that modern layout verification rule decks have tens of thousands of operations, and the above-mentioned dimensional check operators are only a very small part of a set of typical layout verification tasks. Thus, the disclosed methods are not necessarily a substitute for running full chip DRC, but can be used to generate automatic DRC waivers to reduce false errors.

In some examples, QE is used to detect minimum width errors on a waveguide curve as shown below. The governing equations of the upper and lower curve forming the adiabatic taper are:

$$y_1 = 10x_1^2 + 8x_1 + 80$$

$$y_2 = x_2^3 - 2x_2.$$

The minimum width condition can be written as $$(x_1-x_2)^2 + (y_1-y_2)^2 > r^2$$

where r is the constraint and $r^2 \in [400:500]$: we can use QEPCAD to answer this existence problem as shown in Listing 4:

---
LISTING 4
---
```
Enter a variable list: (r2,x1,x2)
Enter the number of free variables: 2
Enter a prenex formula:
(Ex2) [(x1-x2)^2 + (10x1^2 + 8x1 + 80 - x2^3-2x2)^2 < r2].
Before Normalization >
assume [ x1 > = -10 /\ x1 < = 0
/\ r2 > = 400 /\ r2 < = 500 ]
Before Normalization > finish An equivalent quantifier-free
formula:
40 x1^3 + 48 x1^2 - 3587 x1 - 1442 > 0 \/
120 x1^2 + 96 x1 - 3587 < 0 \/
100 x1^4 + 160 x1^3 - 17935 x1^2 - 14420 x1 - r2 + 810100 <
0.
```
---

Solving this with QE, a closed form formula describing the exact condition is obtained, where there will be a minimum width error. Moreover, for some values of r the system can prove that there cannot be an error, which can be useful for self-consistency check of parameters in PDK components. See Listing 5:

---
LISTING 5
---
```
assume [ r2 < 10 ]
An equivalent quantifier-free formula:
FALSE.
```
---

B. Layout Verification Methodology

Having disclosed the building blocks of certain exemplary methods, and example layout verification methodology based on algebraic geometry is further detailed below.

1) Input: Schematic capture of the design in a hierarchical manner, library of primitives (such as rings, S-bends, tapers) in algebraic form of parametric polynomials, technology specification (minimum width rules, etc).

2) Output: Either a certificate of DRC clean data or error markers.

The algorithm is the sequence of following operations.

3) Load Design: The schematic file is parsed and individual components (such as rings, S-bends, couplings, tapers) are loaded into memory. Associated parameters (such as ring radius, taper slopes), along with connectivity and physical placement are also stored in an instance data structure. The root cell of this hierarchical directed acyclic graph is calculated.

4) Evaluate Parameters: Each component's parameters are evaluated in reverse topological order (from bottom of the hierarchical tree leaves to the root). Parameters are checked for self-consistency using component rules, and the rectilinear bounding box for each instance is computed.

5) Create BBox Grid: The bounding box for each instance is placed in a spatial data structure which supports range queries. Thus, given any instance, all other instances whose bounding box intersect with it (or with any arbitrary box) can be calculated in $O(\log(n)+k)$ time, where n is the number of instances and k is the number of intersections reported. After the grid is constructed, a pairwise interaction callback function is called for every pair of intersecting boxes. To check DRC, the boxes are oversized by half the rule check dimension. The callback is of the form: intersectionCallback $(E_1, E_2, BBOX1, BBOX2)$.

6) Recursively Expand Hierarchical Shapes: In the callback, $E_1$ is inspected to see if it is a hierarchical instance, if so, it is expanded and we recursively call the callback function. Similarly, $E_2$ is inspected. However, the order of $E_1$ and $E_2$ is not transposed, so as to enable noncommutative checks such as ENCLOSURE.

7) Perform Callback With BBox Intersection: Once it is known that $E_1$ and $E_2$ are flat, a algebraic geometry representation can be used as follows. Since $E_1$ is a parametric polynomial in $t_1$ (similarly $E_2$ is a function in $t_2$), the range $[t_1:t'_1]$ and $[t_2:t'^2]$ can be calculated which interact with the bounding boxes.

In some examples, The callback function is the majority of the computation (and can be executed in parallel threads).

1) P1: getPolynomial($E_1$, BBOX1): Get polynomial from component; modify it based on BBOX1.

2) P2: getPolynomial($E_2$, BBOX2): Get polynomial from component; modify it based on BBOX2.

3) ApplyCheck[rule,^(BBOXI, BBOX2)]: Calculate bounding box intersection based on rule distance.

4) ApplyCheck(rule, P1, $[t_1:t'_1]$, P2, $[t_2:t'_2]$): Calculate polynomial parameter ranges which interact in the bounding box intersection.

5) QE=ConvertToPrenex(rule, P1, $[t_1:t'_1]$, P2, $[t_2:t'_2]$): Generate the QE equations to check the rule. For all components in the library, prenex conversions are precomputed and can be looked up.

6) Run QuantifierElimination(QE)

7) ReturnResult: If the result of the QE is NULL, then we have no errors, otherwise output from $P1[t_1:t'_1]$ and $P2[t_2:t'_2]$ is generated as error marker.

Figure 10:
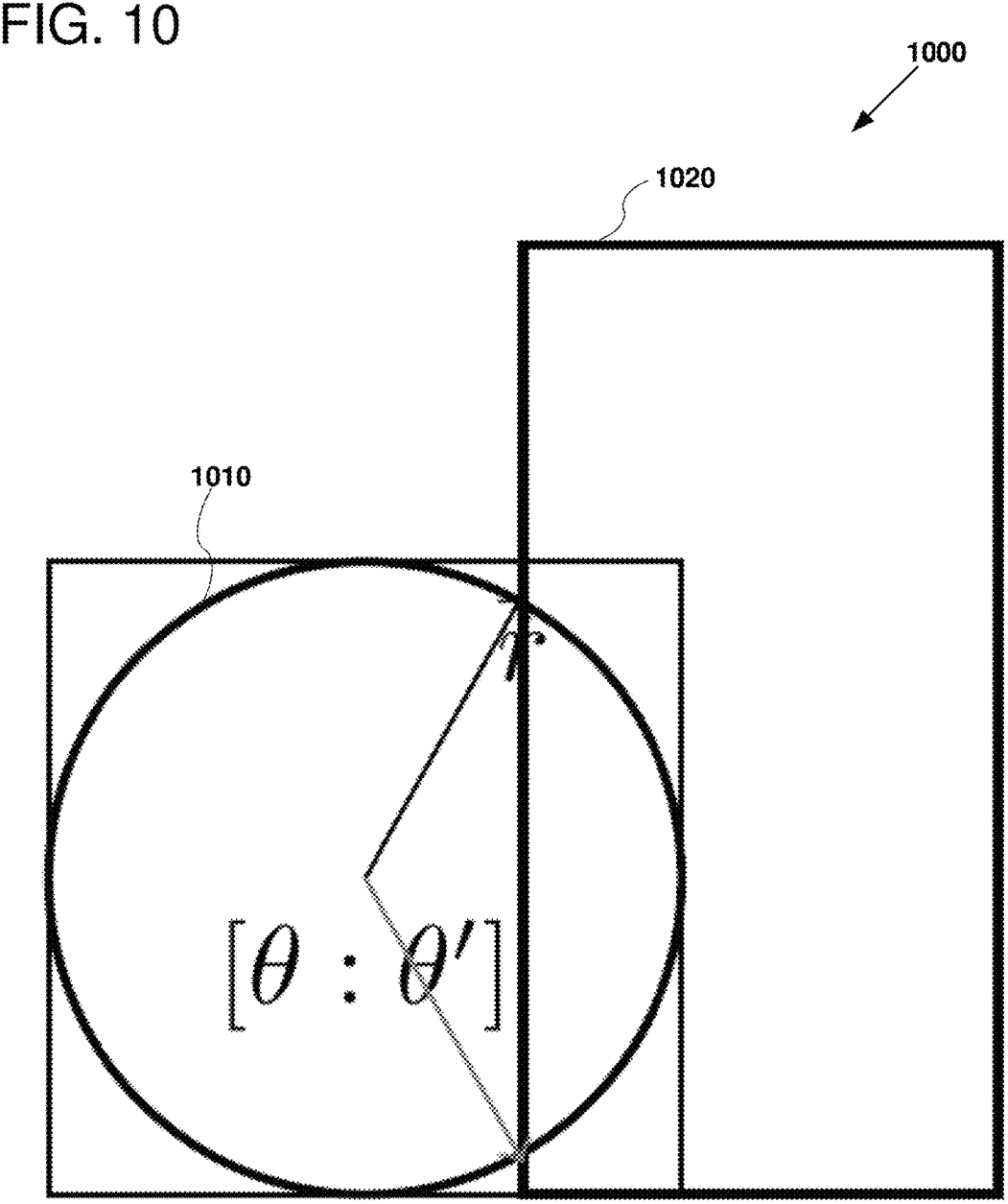
FIG. 10 depicts an inverse computation of a polynomial parameter range from a bounding box intersection, as can be used in certain examples of the disclosed technology.

The above operations include the inverse computation of the polynomial parameter range $(t_1:t'_1)$ of P1 from the bounding box intersection of BBOX1 and BBOX2. As shown in FIG. 10, for primitive components in the library, the polynomial parameter range which causes the component to intersect a given bounding box is dynamically cached. In the layout 1000 of FIG. 10, the ring 1010 is intersecting an overlapping bounding box 1020. Using a trigonometric parameterization, the angle ranges $[\theta:\theta']$ for the ring 1010 interacting with the bounding box 1020 intersection, can be computed and cached.

The algorithmic complexity of the proposed method is $O(kN)$, where k is the expected number of interactions between the bounding boxes, and N is dependent on the maximum degree of the parametric curves (which is usually less than 16). The proposed method was implemented in the C++ programming language using a polynomial arithmetic library.

IX. Example Method of Performing Analysis Operations for an Envelope

Figure 15:
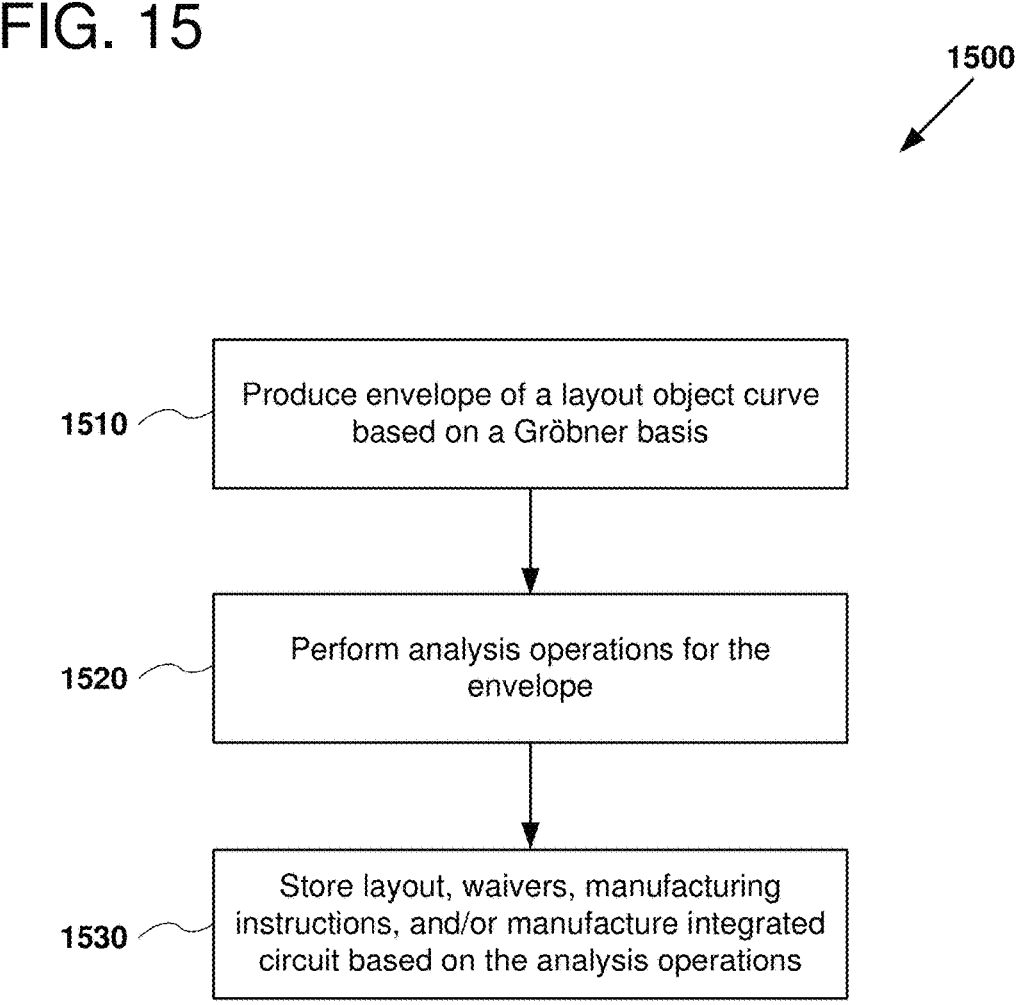
FIG. 15 is a flow chart outlining an exemplary method according to certain examples of the disclosed technology.

FIG. 15 is a flow chart 1500 outlining an example method of performing analysis operations for an envelope of a layout object curve, as can be performed in certain examples of the disclosed technology.

Figure 11:
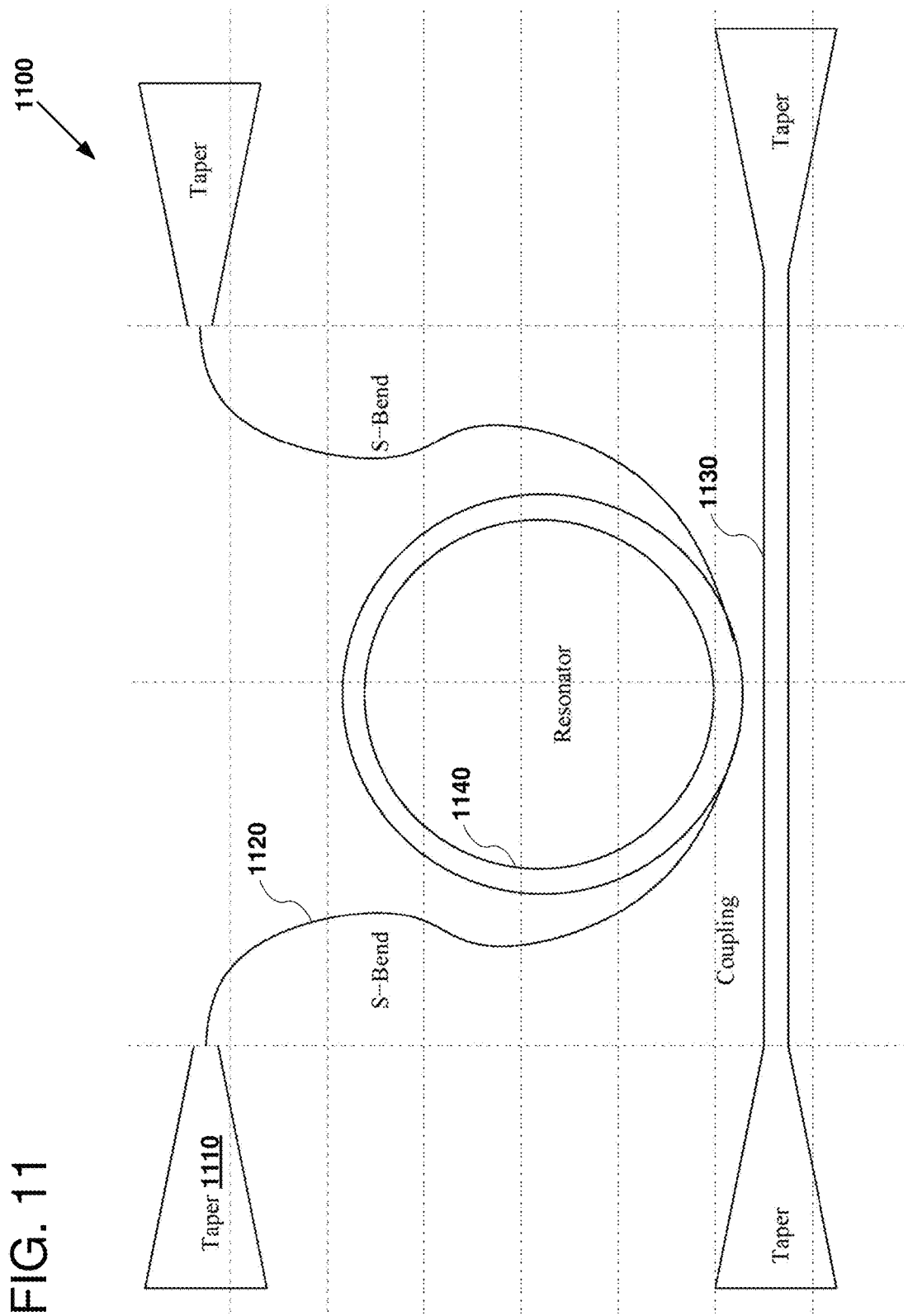
FIG. 11 is a schematic representation of an exemplary photonic coupler circuit, as can be implemented in certain examples of the disclosed technology.
Figure 12:
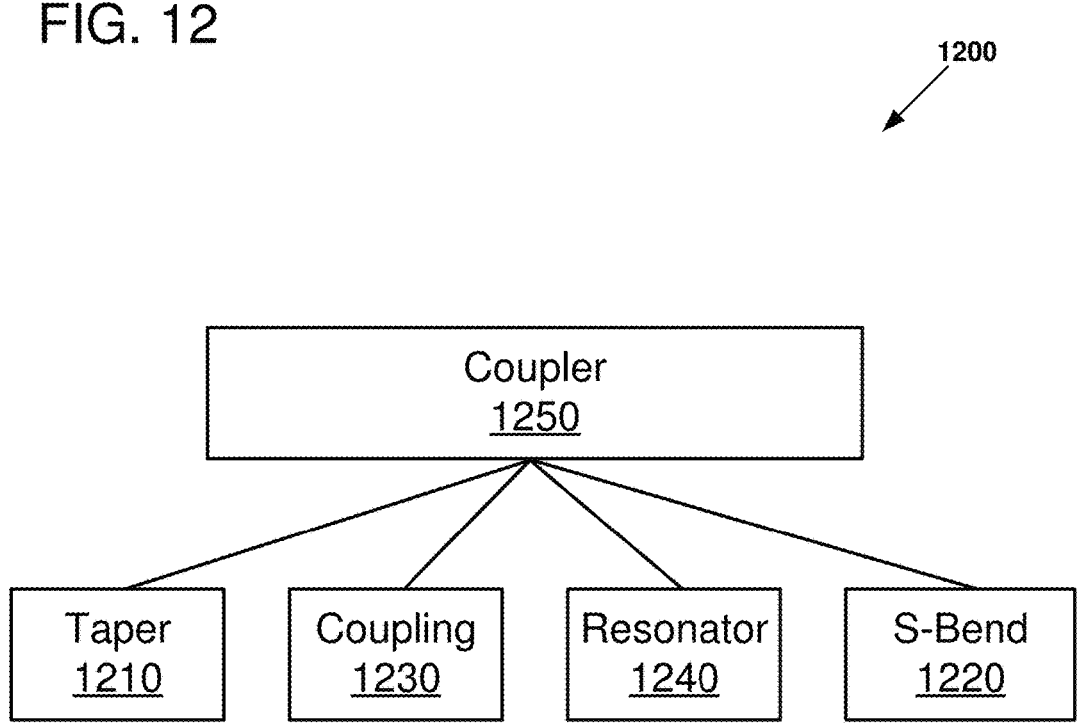
FIG. 12 depicts a hierarchical tree of an example photonic design, as can be used in certain examples of the disclosed technology.
Figure 13:
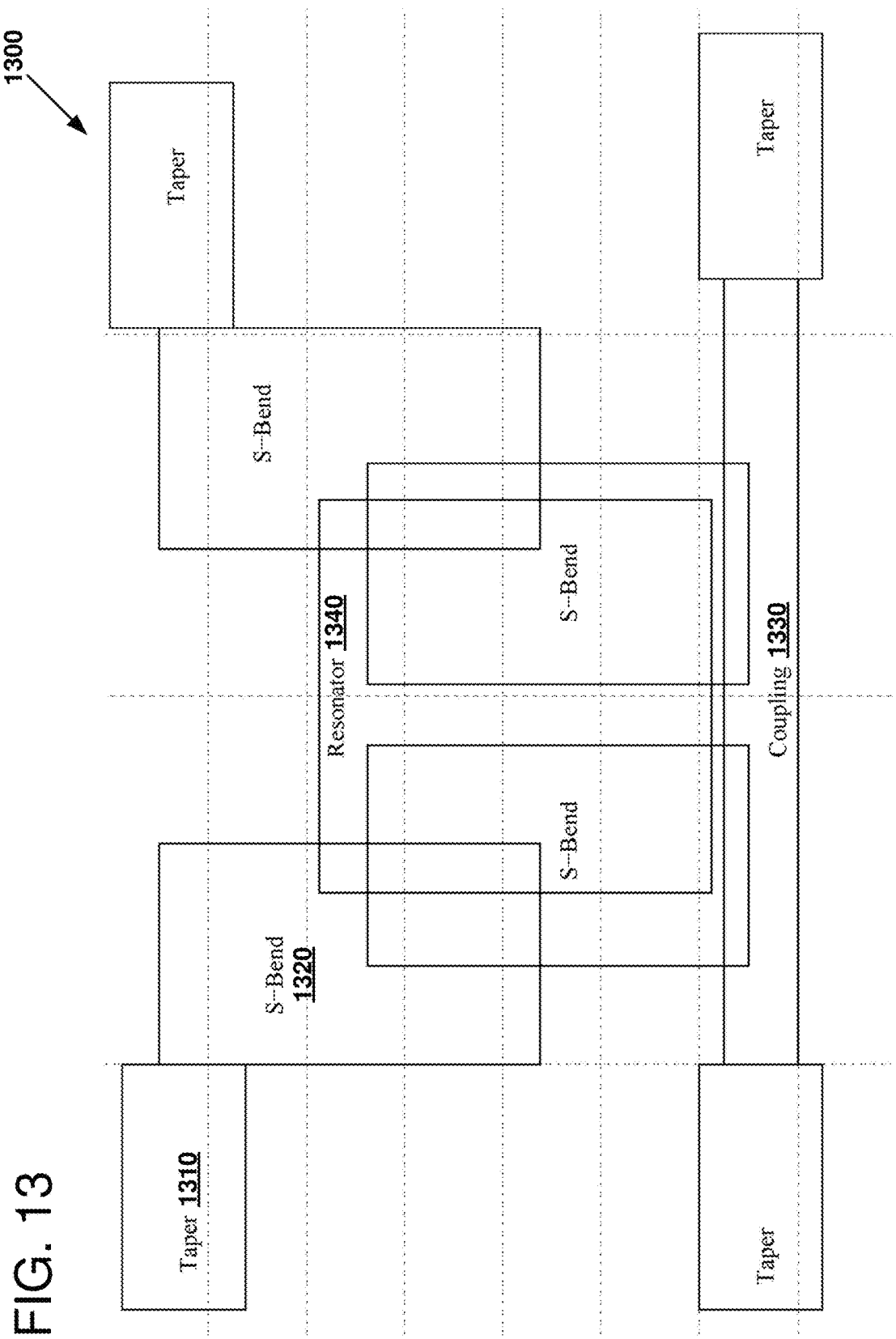
FIG. 13 depicts rectilinear bounding boxes of an example photonic design, as can be used in certain examples of the disclosed technology.

At process block 1510, an envelope is produced for one or more layout object curves based on computing a Gröbner bases for the curves. For example, consider the schematic of the photonic coupler circuit 1100 shown in FIG. 11. The photonic coupler circuit 1100 includes a number of tapers (e.g., taper 1110), S-bends (e.g., S-bend 1120), a coupling 1130, and resonator 1140. A hierarchy tree 1200 of the design is shown in FIG. 12. The number of individual instances (e.g., instances of a taper 1210, an S-bend 1220, a coupling 1230, and a resonator 1240) of each component are not marked in the figure, but are used in the implementation. After parameter checking, the component is evaluated for its rectilinear extent and the resulting collection of bounding boxes are stored in a spatial data structure 1300 as shown in FIG. 13. The bounding boxes include those for the tapers (e.g., taper 1310), the S-bends (e.g., S-bend 1320), the coupling 1330, and the resonator 1340. Once the envelope is produced, the method proceeds to process block 1520.

At process block 1520, analysis operations are performed for the envelope(s) produced at process block 1510. For example, using this grid and the above-described algorithm, QE is called on the pairwise interactions between the taper, S-bend, resonator and coupling primitives. The polynomial equation for the taper is $x=t$, $y=C+w(t)$, where $w(t)$ is an auxiliary function denoting the slope (width) of the taper. The S-bends are polynomials of degree 5. The complete list of primitive components and their parameters is given in Table II. After performing the analysis operations, the method proceeds to process block 1530.

TABLE II

PHOTONIC COMPONENTS AND PARAMETERS

| Component | Parameter | Parametric Equation |
|---|---|---|
| Rectangle | width, centerline | $x = t$, $y = y_0 + w/2$ |
| Ring | $x$, $y$, $r_0$, $r_1$ | $x = r_0 \cos(t)$ |
|  |  | $y = r_0 \sin(t)$ |
| S-Bend [34] | $x_1, y_1, x_2, y_2$ | $x = Wt$ |
|  | $W, V$ | $y = Vt^3(6t^2 - 15t + 10)$ |
| Linear Taper | $x_1, y_{11}, y_{12}$ | $m_1 = \dfrac{y_{21} - y_{11}}{x_2 - x_1}$, $(t, m_1 t + y_{11})$ |
|  | $x_2, y_{21}, y_{22}$ | $m_2 = \dfrac{y_{22} - y_{12}}{x_2 - x_1}$, $(t, m_2 t + y_{21})$ |
| Confocal Taper | $n, r_1, r_2, d, \theta_1, \theta_2$ | [10] |

At process block 1530, the layout can be certified as DRC clean or a number of errors and/or warning for the layout indicated. The layout (or modified layout, once the errors and/or warnings have been addressed) can be stored in a computer-readable storage medium as, for example, a GDSII or OASIS file. In some examples, a mask writer file including instructions for a mask writer or other reticle manufacturing tools is stored in a computer-readable storage medium. In some examples, an integrated circuit is manufactured based at least in part on a layout and/or mask writer file generated at process block 1530.

Figure 14:
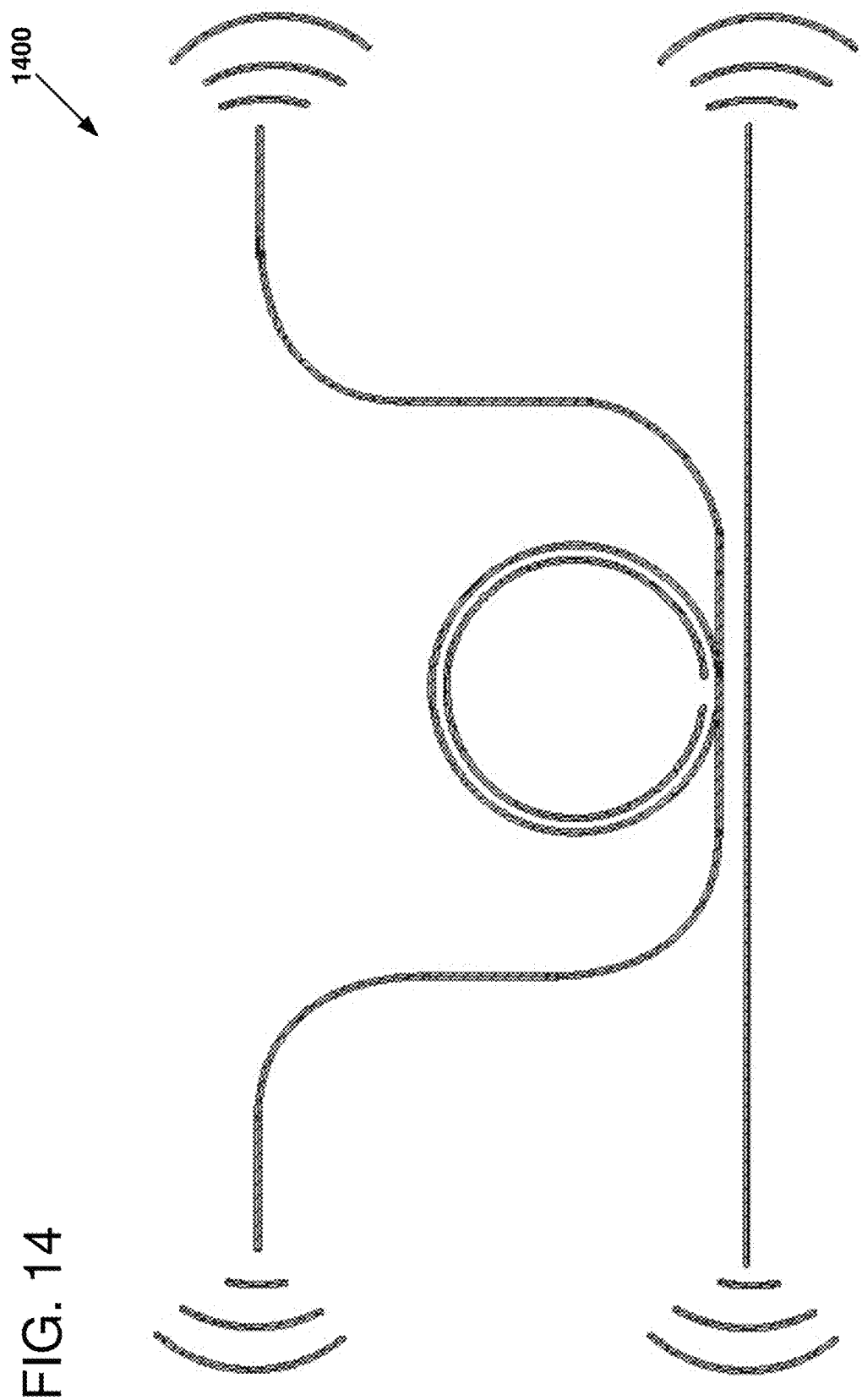
FIG. 14 illustrates a mask layout generated from an algebraic representation according to the disclosed technology.

An example of the generated mask layout 1400 for the coupler is shown in FIG. 14. The complete processing time for running the parameter self-consistency check, minimum width check, spacing check, as well as the mask layout was less than a few minutes. In this particular example, the generated mask layout DRC showed an error, which upon inspection, turned out to be a false error due to grid snapping.

X. Example Method of Manufacturing Objects

Figure 16:
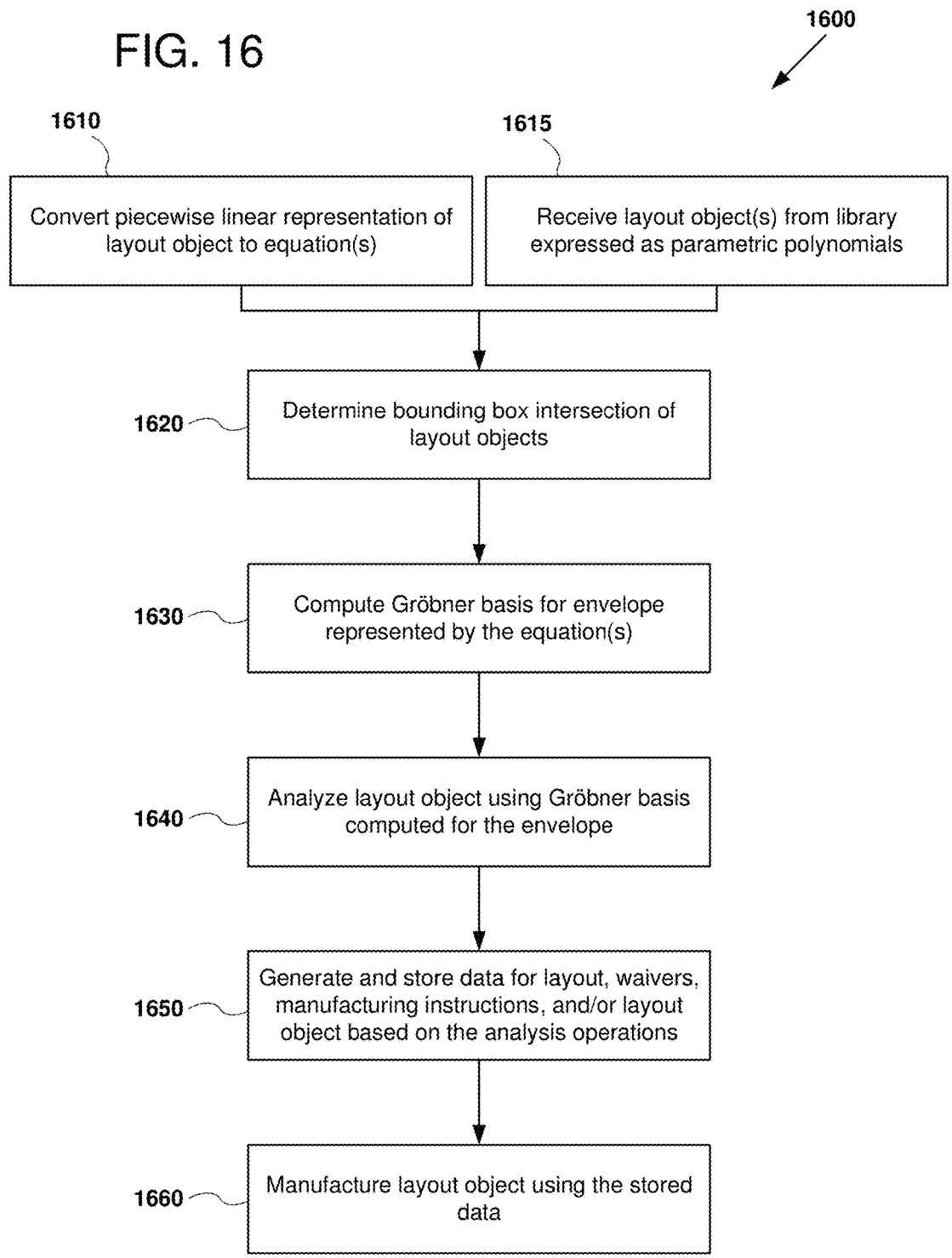
FIG. 16 is a flow chart outlining an exemplary method according to certain examples of the disclosed technology.

FIG. 16 is a flow chart 1600 illustrating a method of manufacturing objects using some of the methods and technologies disclosed herein. For example, the illustrated method can be implemented using the computing environment discussed below regarding FIG. 17. In some examples, additional software, computing resources, and manufacturing equipment can be employed, including equipment for use and manufacture of photolithographic mask and reticle equipment, electron beam patterning, integrated circuit manufacturing, and layout tools based on piecewise linear approximations of features to be created with such equipment.

At process block 1610, a piecewise linear representation of one or more layout objects is received and an equation based representation is generated. For example, layout received in LEF/DEF, GDSII, OASIS, or other suitable representations can be analyzed to determine one or more approximate or exact equations to represent features to be manufactured. Representations are not limited to rectilinear layouts, but can include curved objects, including silicon photonic array wave guides, micro-electronic mechanical systems (MEMS) and/or a micro-fluidics VLSI layouts.

At process block 1615 representations of layout objects form a library expressed as parametric polynomials are received. For examples, curved objects can be represented by one or more equations (e.g., parabolas or other such shapes) in a parameterized form. Such representations can be included within a design layout hierarchy as parameterized cells. Values for the parameters can be provided by a designer to create manufactured objects. For example, a curve object can be represented by a polynomial equation associated with the curve object and a width (e.g., expressed in microns or nanometers) provided by the designer. In some examples, the library further includes equations for checking that the parameterized object satisfies manufacturing rules or guidelines, including width, space, enclosure, notch, density, and other suitable layout checks. By providing a library of components in a parameterized form using polynomial representation, design effort can be reduced.

At process block 1620, bounding box intersections of layout objects to be analyzed are computed in order to reduce the amount of processing required. For example, a bounding box rectangle set to the maximum extent of a layout object, or a maximum extent of the layout object plus an additional distance, can be used to determine which layout objects will interact with each other in forming the layout. In some examples, these operations can be reduced or skipped entirely, but this can increase the amount of data to be processed. In some examples, the bounding box intersections are determined based in part on the layers that the analyzed objects occupy.

Equation-based representations of layout objects produced at process block 1610 and/or process block 1615, that are determined to be within proximity of one another based on the optional bounding box comparison performed at process block 1620, can be combined into a layout representation and passed to process block 1630. At process block 1630, a Gröbner basis for an envelope represented by the equations produced at process block 1610 is computed. The Gröbner basis form allows for facilitated analysis and manipulation of representations of the layout objects. Such analysis can be performed in some examples using the computer algebra system REDUCE.

At process block 1640, the layout objects are analyzed using the Gröbner basis computed at process block 1630. For example, singularity detection, manufacturability checking, and/or bias application can be performed. REDUCE can be used to perform these operations in certain examples of the disclosed technology. In some examples, envelopes are produced using Buchberger's algorithm. In some examples, QE is used to perform with, spacing, and other layout analysis checks. In some examples, the checks include the use of derivatives and/or integrals calculated based on the computed Gröbner basis.

At process block 1650, data is generated and stored for layout, waivers, manufacturing instructions, and/or layout objects based on the analysis performed at process block 1640. For example, the data can be stored in a computer-readable storage medium coupled locally to a server or workstation, stored in a storage medium coupled to a server or workstation accessible via a network (including in other countries), or streamed to other computational resources via a computer network. Any suitable format can be used, including formats that represent layout objects in rectilinear forms such as LEF/DEF, GDSII, or OASIS. Curved objects can approximated by rectilinear forms in such formats. Data can be prepared for a number of different manufacturing tools, including mask writers, reticle writers, and electron beam writers. In some examples, light source optimization can be performed for use with a photolithographic process. In some examples, data for 3-D printers can be produced. In some examples, reticle enhancement technologies (RET), including non-printing features such as scattering bars and other subresolution assist features (SRAFs) and modifications to printed features (e.g., for optical proximity correction (OPC) can be included in the data. In some examples, the data includes waivers for a traditional layout verification tool. For example, waivers specifying an error location, error layer, error shape, and/or error size can be stored with the data, and when the data is checked using a layout verification DRC flow, false errors caused by curved objects or approximations of curved objects can be waived, reducing the need to analyze and manually waive such errors by the designer. In some examples, curves are represented by parametric curves or Bezier curves.

At process block 1660, features for a layout object are created using a manufacturing process. This can include manufacture of a mask or reticle for integrated circuit manufacturing, manufacture of an integrated circuit itself, including photonic components, or other suitable layout objects. Layout objects that can be manufactured include but are not limited to, optical interconnect, silicon photonic device, a micro-electronic mechanical system (MEMS), and a micro-fluidic devices. The data can be used with lithographic steppers using a mask or reticle to pattern photoresist on a surface. In other examples, an electron beam or other direct write system is used to expose a pattern onto photoresist on a surface. In some examples the features are further modified to comply or improve the layout in view of the analysis performed at process block 1640.

XI. Example Computing Environment

Figure 17:
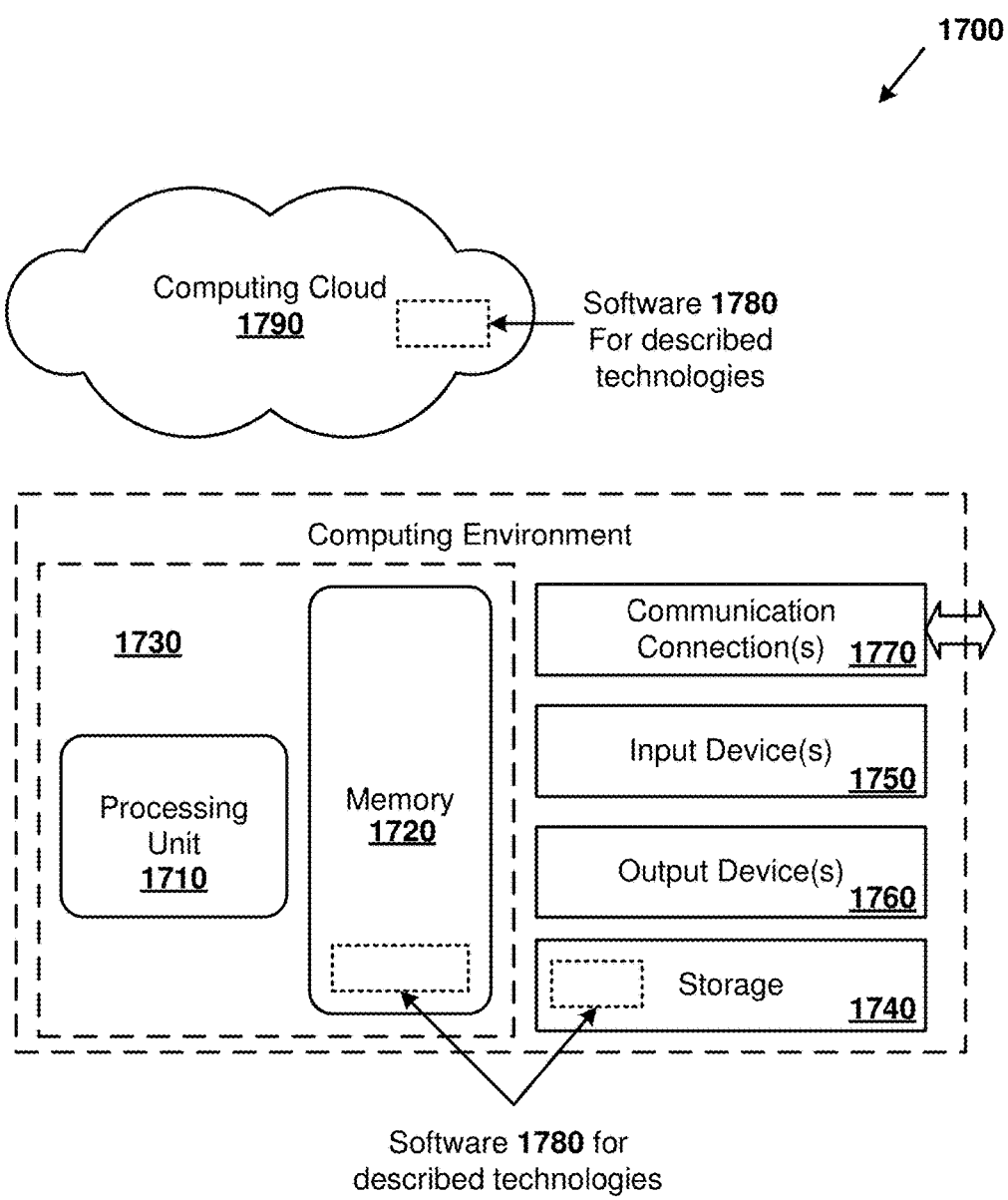
FIG. 17 is a diagram of a suitable computing environment in which certain disclosed methods and apparatus can be implemented.

FIG. 17 illustrates a generalized example of a suitable computing environment 1700 in which described embodiments, techniques, and technologies, including producing an envelope of a curve based at least in part on a Gröbner basis and performing one or more analysis operations for the envelope, can be implemented. For example, the computing environment 1700 can implement any of the analysis operations, as described herein.

The computing environment 1700 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 17, the computing environment 1700 includes at least one central processing unit 1710 and memory 1720. In FIG. 17, this most basic configuration 1730 is included within a dashed line. The central processing unit 1710 executes computer-executable instructions and may be a real or a virtual processor. In a multi-processing system, multiple processing units execute computer-executable instructions to increase processing power and as such, multiple processors can be running simultaneously. The memory 1720 may be volatile memory (e.g., registers, cache, RAM), non-volatile memory (e.g., ROM, EEPROM, flash memory, etc.), or some combination of the two. The memory 1720 stores software 1780, images, and video that can, for example, implement the technologies described herein. A computing environment may have additional features. For example, the computing environment 1700 includes storage 1740, one or more input devices 1750, one or more output devices 1760, and one or more communication connections 1770. An interconnection mechanism (not shown) such as a bus, a controller, or a network, interconnects the components of the computing environment 1700. Typically, operating system software (not shown) provides an operating environment for other software executing in the computing environment 1700, and coordinates activities of the components of the computing environment 1700.

The storage 1740 may be removable or non-removable, and includes magnetic disks, magnetic tapes or cassettes, CD-ROMs, CD-RWs, DVDs, or any other medium which can be used to store information and that can be accessed within the computing environment 1700. The storage 1740 stores instructions for the software 1780, plugin data, and messages, which can be used to implement technologies described herein.

The input device(s) 1750 may be a touch input device, such as a keyboard, keypad, mouse, touch screen display, pen, or trackball, a voice input device, a scanning device, or another device, that provides input to the computing environment 1700. For audio, the input device(s) 1750 may be a sound card or similar device that accepts audio input in analog or digital form, or a CD-ROM reader that provides audio samples to the computing environment 1700. The output device(s) 1760 may be a display, printer, speaker, CD-writer, or another device that provides output from the computing environment 1700.

The communication connection(s) 1770 enable communication over a communication medium (e.g., a connecting network) to another computing entity. The communication medium conveys information such as computer-executable instructions, compressed graphics information, video, or other data in a modulated data signal. The communication connection(s) 1770 are not limited to wired connections (e.g., megabit or gigabit Ethernet, Infiniband, Fibre Channel over electrical or fiber optic connections) but also include wireless technologies (e.g., RF connections via Bluetooth, WiFi (IEEE 802.11a/b/n), WiMax, cellular, satellite, laser, infrared) and other suitable communication connections for providing a network connection for the disclosed computer-executable instructions. In a virtual host environment, the communication(s) connections can be a virtualized network connection provided by the virtual host.

Some embodiments of the disclosed methods can be performed using computer-executable instructions implementing all or a portion of the disclosed technology in a computing cloud 1790. For example, layout design operations can be performed in the computing environment while analysis operations can be performed on servers located in the computing cloud 1790. In some examples, the servers in the computing cloud 1790 are located in a different country or jurisdiction than the computing environment.

Computer-readable media are any available media that can be accessed within a computing environment 1700. By way of example, and not limitation, with the computing environment 1700, computer-readable media include memory 1720 and/or storage 1740. As should be readily understood, the term computer-readable storage media includes the media for data storage such as memory 1720 and storage 1740, and not transmission media such as modulated data signals.

XII. Additional Examples of the Disclosed Technology

Additional examples of the disclosed technology include the following examples, whether considered as recited below or in combination and subcombination with one or more of the features described above.

In some examples of the disclosed technology, a method of analyzing a feature to be fabricated using a lithographic manufacturing process, includes receiving data representing the feature, the data including an equation or inequality defining a layout of at least a portion of the feature and, by a computer, performing one or more operations for the feature using the data.

In some examples, the method further includes producing an envelope of a curve for the feature portion using a Gröbner basis calculated for the equation or inequality, where the operations comprise analysis operations performed for the envelope. In some examples, the method further includes comprising using quantifier elimination (QE) to perform one or more dimensional checks for the feature.

In some examples, the operations include at least one or more of the following verification checks: a dimensional check, a spacing check, a width check, and/or an enclosure check. In some examples, the operations include at least one or more of the following operations: singularity detection, manufacturability checking, and/or bias application. In some examples, the operations include filtering data representing the layout using rectilinear bounding boxes representing the extent of a plurality of objects in the layout. In some examples the feature is all or a portion of one of the following: an optical interconnect, silicon photonic device, a micro-electronic mechanical system (MEMS), or a micro-fluidic device. In some examples the operations comprise producing an envelope for the feature based at least in part on using Buchberger's algorithm.

In some examples, the method further includes storing layout data generated by performing the operations in a computer readable storage device or memory. In some examples, one or more computer readable storage media storing computer-readable instructions that when executed by a computer, cause the computer to perform any of the disclosed methods.

In some examples of the disclosed technology, one or more computer-readable storage media store computer-readable instructions that when executed by a computer, cause the computer to perform a method of preparing data for geometric features to be created via a manufacturing process, the instructions including instructions for evaluating a plurality of features represented with parametric curves by generating envelopes for each respective features, and instructions for performing dimensional checks with the generated envelopes to determine whether the features comply with one or more rules specified for the manufacturing process. In some examples, the instructions for performing the dimensional checks comprise instructions for performing quantifier elimination. In some examples, the envelopes are generated by computing a Gröbner basis for one or more equations representing the parametric curves. In some examples, the media further include instructions for transforming data expressed in a piecewise linear representation into the parametric curve representation. In some examples, the instructions for performing the dimensional checks use equation-based design rules.

In some examples of the disclosed technology, a system includes one or more processors; memory coupled to the processors, and one or more computer readable storage media storing computer-readable instructions that when executed by the processors, cause the system to perform a method of analyzing layout objects represented by an equation or inequality describing a feature to be manufactured with a photolithographic process. Suitable processors for implemented disclosed systems include RISC, CISC, FPGA, ASIC, and/or SoC technologies.

In some examples, the system further includes a database coupled to the processor, the database including: a library of parameterized cells, each of the parameterized cells being represented by one or more equations and one or more parameters describing a layout object described by the parameterized cell, and a set of rules for verifying that the layout object complies with one or more constraints of the photolithographic process. In some examples, the system further includes a mask writer, a reticle writer, or an electron beam writer configured to image a pattern for the layout objects onto a photoresist surface. In some examples, the system's computer-readable storage media further include instructions for one or more of the following tools: a layout editor, a layout verification tool, or a physical extraction tool, wherein the instructions for the tools analyze the layout object based at least in part on computing a Gröbner basis for the equation or inequality. In some examples, the system's computer-readable storage media further include data for one or more of the following: piecewise linear data generated using the equation or inequality describing the feature, data used to generate a mask or reticle for the photolithographic process, data used to generate reticle enhancement features for the photolithographic process, or data used to generate waivers for a rectilinear-based layout verification tool.

In view of the many possible embodiments to which the principles of the disclosed subject matter may be applied, it should be recognized that the illustrated embodiments are only preferred examples and should not be taken as limiting the scope of the scope of the claims to those preferred examples. Rather, the scope of the claimed subject matter is defined by the following claims. We therefore claim as our invention all that comes within the scope of these claims and their equivalents.

What is claimed is:

1. A method comprising:
by a computer:
verifying, using a Grobner envelope, non-rectilinear features of a lithographic layout, including by:
receiving layout data representing geometric photolithographic layout features that include the non-rectilinear features, the layout data including parametric curves that represent the geometric photolithographic layout features;
creating bounding boxes for the geometric photolithographic layout features represented with the parametric curves;
determining bounding box intersections for the geometric photolithographic layout features represented with parametric curves;
combining, into a combined geometric photolithographic layout feature, the parametric curves of given geometric photolithographic layout features with respective bounding boxes that were determined to intersect;
generating envelopes for the geometric photolithographic layout features, including the combined geometric photolithographic layout feature, the envelopes being generated using Grobner basis functions of respective families of second curves around each parametric curve; and
performing verification checks with the generated envelopes to determine whether the geometric photolithographic layout features, including the non-rectilinear features, comply with one or more rules specified for a manufacturing process.

2. The method of claim 1, further comprising using quantifier elimination (QE) to perform one or more dimensional checks for the non-rectilinear features.

3. The method of claim 1, further comprising performing at least one or more of the following operations: singularity detection, manufacturability checking, and/or bias application.

4. The method of claim 1, further comprising filtering second data representing the photolithographic layout, including the generated envelopes, using the bounding boxes.

5. The method of claim 1, wherein the non-rectilinear features are all or a portion of one of the following: an optical interconnect, silicon photonic device, a micro-electronic mechanical system (MEMS), or a micro-fluidic device.

6. The method of claim 1, wherein generating the envelopes using the Grobner basis functions is based at least in part on using Buchberger's algorithm.

7. The method of claim 1, further comprising, subsequent to the performing the verification checks, storing verified layout data in a computer readable storage device or memory.

8. One or more computer readable storage media storing computer-readable instructions that, when executed by a computer, cause the computer to perform the method of claim 1.

9. One or more computer-readable storage media storing computer-readable instructions that, when executed by a computer, cause the computer to:
  evaluate geometric photolithographic layout features represented with parametric curves by:
    creating bounding boxes for the geometric photolithographic layout features represented with the parametric curves;
    determining bounding box intersections for the geometric photolithographic layout features represented with parametric curves;
    combining, into a combined geometric photolithographic layout feature, the parametric curves of given geometric photolithographic layout features with respective bounding boxes that were determined to intersect;
    generating envelopes for the geometric photolithographic layout features, including the combined geometric photolithographic layout feature, the envelopes being generated using Grobner basis functions of respective families of second curves around each parametric curve; and
    performing dimensional checks with the generated envelopes to determine whether the geometric photolithographic layout features comply with one or more rules specified for a manufacturing process.

10. The computer-readable storage media of claim 9, wherein the instructions for performing the dimensional checks comprise instructions for performing quantifier elimination.

11. The computer-readable storage media of claim 9, further comprising instructions for transforming data expressed in a piecewise linear representation into the parametric curve representation.

12. The computer-readable storage media of claim 9, wherein the instructions for performing the dimensional checks use equation-based design rules.

13. A system comprising:
  one or more processors;
  memory coupled to the processors; and
  one or more computer readable storage media storing computer-readable instructions that when executed by the processors, cause the system to evaluate photolithographic layout objects represented with parametric curves by:
    creating bounding boxes for the photolithographic layout objects represented with the parametric curves;
    determining bounding box intersections for the photolithographic layout objects represented with parametric curves;
    combining, into a combined photolithographic layout object, the parametric curves of given photolithographic layout objects with respective bounding boxes that were determined to intersect;
    generating envelopes for the photolithographic layout objects, including the combined photolithographic layout object, the envelopes being generated using Grobner basis functions of respective families of second curves around each parametric curve; and
    performing verification checks with the generated envelopes to determine whether the geometric photolithographic layout objects comply with one or more rules specified for a photolithographic process.

14. The system of claim 13, further comprising a database coupled to the processor, the database including:
  a library of parameterized cells, each of the parameterized cells being represented by one or more equations and one or more parameters describing a corresponding photolithographic layout object described by the parameterized cell; and
  a set of rules for verifying that the corresponding layout object complies with one or more constraints of a photolithographic process.

15. The system of claim 13, further comprising a mask writer, a reticle writer, or an electron beam writer configured to image a pattern for the photolithographic layout objects onto a photoresist surface.

16. The system of claim 13, wherein the computer readable storage media further include instructions for one or more of the following tools: a layout editor, a layout verification tool, or a physical extraction tool, wherein the instructions for the tools, when executed, cause the system to analyze the photolithographic layout objects based at least in part on computing a Grobner basis for a second family of curves around a first curve defined by the equation or inequality.

17. The system of claim 13, further comprising computer-readable storage media storing data for one or more of the following: piecewise linear data from which the equation or inequality describing the curved feature is generated, data used to generate a mask or reticle for a photolithographic process, data used to generate reticle enhancement features for the photolithographic process, or data used to generate waivers for a rectilinear-based layout verification tool.

18. The method of claim 1, further comprising storing on computer readable storage media, subsequent to the performing the verification checks, a file comprising instructions for a mask writer or reticle manufacturing tool to manufacture a mask or reticle including the non-rectilinear feature.

19. The method of claim 7, wherein at least one verification check indicates an error or warning, and wherein the verified layout data is stored following modification to address the error or warning.

* * * * *